United States Patent
Enomoto et al.

(10) Patent No.: US 9,827,824 B2
(45) Date of Patent: Nov. 28, 2017

(54) THERMAL MANAGEMENT SYSTEM FOR VEHICLE

(71) Applicant: DENSO CORPORATION, Kariya, Aichi-pref. (JP)

(72) Inventors: Norihiko Enomoto, Nagoya (JP); Nobuharu Kakehashi, Toyoake (JP); Michio Nishikawa, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 455 days.

(21) Appl. No.: 14/423,665

(22) PCT Filed: Aug. 23, 2013

(86) PCT No.: PCT/JP2013/004985
§ 371 (c)(1),
(2) Date: Feb. 24, 2015

(87) PCT Pub. No.: WO2014/034061
PCT Pub. Date: Mar. 6, 2014

(65) Prior Publication Data
US 2015/0217622 A1 Aug. 6, 2015

(30) Foreign Application Priority Data

Aug. 28, 2012 (JP) ................................. 2012-187152

(51) Int. Cl.
*B60H 1/00* (2006.01)
*B60K 11/02* (2006.01)
(Continued)

(52) U.S. Cl.
CPC ..... *B60H 1/00271* (2013.01); *B60H 1/00278* (2013.01); *B60H 1/00385* (2013.01);
(Continued)

(58) Field of Classification Search
CPC .. F28F 27/00; F28F 27/02; B60H 1/00; B60H 1/00271; B60H 1/00278; B60H 1/00385;
(Continued)

(56) References Cited

U.S. PATENT DOCUMENTS 5,203,498 A * 4/1993 Kajikawa ........... B60H 1/00885
237/12.3 B
5,497,941 A * 3/1996 Numazawa ............ B60H 1/004
165/43

(Continued)

FOREIGN PATENT DOCUMENTS

JP 2001280135 A 10/2001
JP 2003262127 A 9/2003
(Continued)

OTHER PUBLICATIONS

International Search Report and Written Opinion (in Japanese with English Translation) for PCT/JP2013/004985, dated Oct. 8, 2013; ISA/JP.

(Continued)

*Primary Examiner* — Len Tran
*Assistant Examiner* — Gustavo Hincapie Serna
(74) *Attorney, Agent, or Firm* — Harness, Dickey & Pierce, P.L.C.

(57) ABSTRACT

A first-pump arrangement flow path, temperature-adjustment target-device arrangement flow paths, and a second-pump arrangement flow path are connected to a communication flow path in this order from one end side to the other end side of the communication flow path. A first heat exchanger is disposed in the first-pump arrangement flow path among numerous flow paths, which is connected to the communication flow path at a position on a side of the first-pump arrangement flow path, rather than the flow path in which a second heat exchanger is disposed. The switching (Continued)

portion is operated to establish communication between plural flow paths, starting from the flow path connected to the communication flow path at the position closest to the one end side among the numerous flow paths, up to the flow path connected to the communication flow path at an n-th position counted from the one end side among the numerous flow paths.

18 Claims, 20 Drawing Sheets

(51) Int. Cl.
    *B60L 1/00*           (2006.01)
    *B60L 1/02*           (2006.01)
    *B60H 1/08*           (2006.01)
    *B60H 1/22*           (2006.01)
    *B60L 3/00*           (2006.01)
    *B60L 11/18*          (2006.01)
    *B60H 1/03*          (2006.01)

(52) U.S. Cl.
CPC ........... *B60H 1/00878* (2013.01); *B60H 1/03* (2013.01); *B60H 1/08* (2013.01); *B60H 1/22* (2013.01); *B60K 11/02* (2013.01); *B60L 1/003* (2013.01); *B60L 1/02* (2013.01); *B60L 3/00* (2013.01); *B60L 11/1874* (2013.01); *B60L 2240/34* (2013.01); *B60L 2240/36* (2013.01); *B60L 2240/425* (2013.01); *B60L 2240/525* (2013.01); *B60L 2240/545* (2013.01); *Y02T 10/642* (2013.01); *Y02T 10/705* (2013.01); *Y02T 10/7005* (2013.01); *Y02T 90/16* (2013.01)

(58) Field of Classification Search
CPC ........ B60H 1/00878; B60H 1/08; B60H 1/22; B60K 11/02; B60L 1/003; B60L 11/187; B60L 11/1874; B60L 2240/34; B60L 2240/36; Y02T 10/7005
USPC ................................................. 165/100, 101
See application file for complete search history.

(56) References Cited

U.S. PATENT DOCUMENTS

| | | | | |
|---|---|---|---|---|
| 5,709,102 A | * | 1/1998 | Fukumoto | B60H 1/00907 62/324.1 |
| 5,904,052 A | * | 5/1999 | Inoue | B60H 1/00007 165/43 |
| 6,357,541 B1 | * | 3/2002 | Matsuda | B60K 6/22 165/43 |
| 6,464,027 B1 | | 10/2002 | Dage et al. | |
| 2003/0127528 A1 | | 7/2003 | Sabhapathy et al. | |
| 2006/0032623 A1 | * | 2/2006 | Tsubone | B60H 1/00492 165/202 |
| 2007/0245737 A1 | * | 10/2007 | Inaba | B60H 1/00885 60/670 |
| 2011/0113800 A1 | * | 5/2011 | Sekiya | B60H 1/00278 62/151 |
| 2011/0296855 A1 | | 12/2011 | Johnston et al. | |
| 2012/0037336 A1 | | 2/2012 | Ishikawa et al. | |
| 2012/0180515 A1 | * | 7/2012 | Morimoto | F24F 3/06 62/324.6 |
| 2012/0183815 A1 | | 7/2012 | Johnston et al. | |
| 2012/0205088 A1 | * | 8/2012 | Morisita | B60H 1/00921 165/202 |
| 2012/0214079 A1 | * | 8/2012 | Suematsu | H01M 8/04291 429/444 |

FOREIGN PATENT DOCUMENTS

| | | |
|---|---|---|
| JP | 2006051852 A | 2/2006 |
| JP | 2009202794 A | 9/2009 |
| JP | 2011007152 A | 1/2011 |
| JP | 2011117716 A | 6/2011 |
| JP | 2011121551 A | 6/2011 |
| JP | 2011255879 A | 12/2011 |
| WO | WO-2010128547 A1 | 11/2010 |
| WO | WO-2014034062 A1 | 3/2014 |

OTHER PUBLICATIONS

U.S. Appl. No. 14/423,666, filed Feb. 24, 2015, Norihiko Enomoto et al.

* cited by examiner

THERMAL MANAGEMENT SYSTEM FOR VEHICLE

CROSS REFERENCE TO RELATED APPLICATIONS

This application is a U.S. National Phase Application under 35 U.S.C. 371 of International Application No. PCT/JP2013/004985 filed on Oct. 23, 2013 and published in Japanese as WO 2014/034061 A1 on Mar. 6, 2014. This application is based on and claims the benefit of priority from Japanese Patent Application 2012-187152 filed on Aug. 28, 2012. The entire disclosures of all of the above applications are incorporated herein by reference.

FIELD OF THE INVENTION

The preset disclosure relates to a thermal management system used for a vehicle.

BACKGROUND ART

Conventionally, as disclosed in Patent Document 1, there is proposed a heat controller for cooling a motor generator, an inverter, a battery and a vehicle interior of an electric car.

The heat controller in the related art includes a cooling circuit for circulation of a coolant used for cooling the motor generator and the inverter, a first circulation circuit for circulation of a coolant used for cooling the battery and vehicle interior, and a second circulation circuit for circulation of a coolant exchanging heat with outside air through an exterior heat exchanger.

Further, the heat controller includes a first valve for disconnecting between the cooling circuit and the first circulation circuit, a second valve for connecting the cooling circuit to either the first circulation circuit or second circulation circuit, and a third valve for disconnecting between the cooling circuit and the second circulation circuit. The respective valves are controlled to switch the subject of connection of the cooling circuit between the first and second circulation circuits.

Heat can be transferred by a heat transfer device between the coolant circulating through the first circulation circuit and the coolant circulating through the second circulation circuit. The heat transfer device transfers the heat from the coolant at a low temperature to the coolant at a high temperature between the coolants in the first and second circulation circuits.

The heat of the coolant in the first circulation circuit is transferred to the coolant in the second circulation circuit by the heat transfer device, and the heat of the coolant in the second circulation circuit is dissipated into the outside air by the outdoor heat exchanger, so as to cool the battery and vehicle compartment.

The cooling circuit is connected to the first circulation circuit or second circulation circuit by use of the first to third valves, so that the heat of the coolant in the cooling circuit can be dissipated to the outside air by the outdoor heat exchanger in the second circulation circuit, thereby cooling the motor generator and inverter.

RELATED ART DOCUMENT

Patent Document

Patent Document 1: Japanese Unexamined Patent Application Publication No. 2011-121551

SUMMARY OF INVENTION

The inventors of the present application have found through their studies that a cooling system for cooling a plurality of cooling target devices, including a motor generator, inverter, battery, and vehicle compartment, has an advantage that only one exterior heat exchanger is required. However, the entire circuit configuration of the system might be complicated. Such complexity might become more significant as the number of cooling target devices is increased.

In addition to the motor generator, the inverter, and the battery, the cooling target devices which require cooling include, for example, an oil cooler, an intercooler, or the like. Those cooling target devices have different required cooling temperatures.

In order to appropriately cool the respective cooling target devices, the coolant (heat medium) to circulate through the respective cooling target devices is proposed to be switchable among the devices, thereby leading to an increase in the number of the circulation circuits (flow paths) according to the number of cooling target devices. Together with the increase, the number of valves for connecting/disconnecting between the respective circulation circuits and the cooling circuits is also increased, thereby resulting in a very complicated connection structure between the respective circulation circuits and the cooling circuits.

The present disclosure has been made in view of foregoing matters, and it is an object of the present disclosure to simplify the structure of a thermal management system for a vehicle that can switch heat media circulating through a plurality of flow paths.

In order to achieve the foregoing object, a thermal management system for a vehicle according to an aspect of the present disclosure includes a first pump and a second pump, a first heat exchanger and a second heat exchanger, at least one of temperature adjustment target devices, numerous flow paths, a switching portion, and a communication flow path. The first and second pumps suck and discharge the heat medium. The first and second heat exchangers exchange heat with the heat medium to change the temperature of the heat medium. The at least one of temperature adjustment target devices has the temperature adjusted by the heat medium. The numerous flow paths are adapted to allow the heat medium to flow therethrough, and include a first-pump arrangement flow path in which the first pump is disposed, a second-pump arrangement flow path in which the second pump is disposed, and a temperature-adjustment target-device arrangement flow path in which one or more of the temperature adjustment target devices is disposed. The switching portion is connected to one ends of the numerous flow paths, and adapted to selectively establish communication between the numerous flow paths. The communication flow path is connected in parallel to the other ends of the numerous flow paths, and adapted to establish communication between the flow paths.

The first-pump arrangement flow path, the temperature-adjustment target-device arrangement flow path, and the second-pump arrangement flow path are connected to the communication flow path in this order from one end side of the communication flow path toward the other end side of the communication flow path. The first heat exchanger is disposed in the flow path that is connected to the communication flow path at a position on a side of the first-pump arrangement flow path, rather than the flow path in which the second heat exchanger is disposed, among the numerous flow paths. The switching portion is operated to establish communication between a plurality of flow paths, starting from the flow path connected to the communication flow path at the position closest to the one end side of the communication flow path, among the numerous flow paths, up to the flow path connected to the communication flow path at an n-th position counted from the one end side among the numerous flow paths.

Therefore, the heat media circulating through the numerous flow paths can be switched with a simple structure in which the numerous flow paths are connected in parallel between the switching portion and the communication flow path

DESCRIPTION OF EMBODIMENTS

First Embodiment

Figure 1:
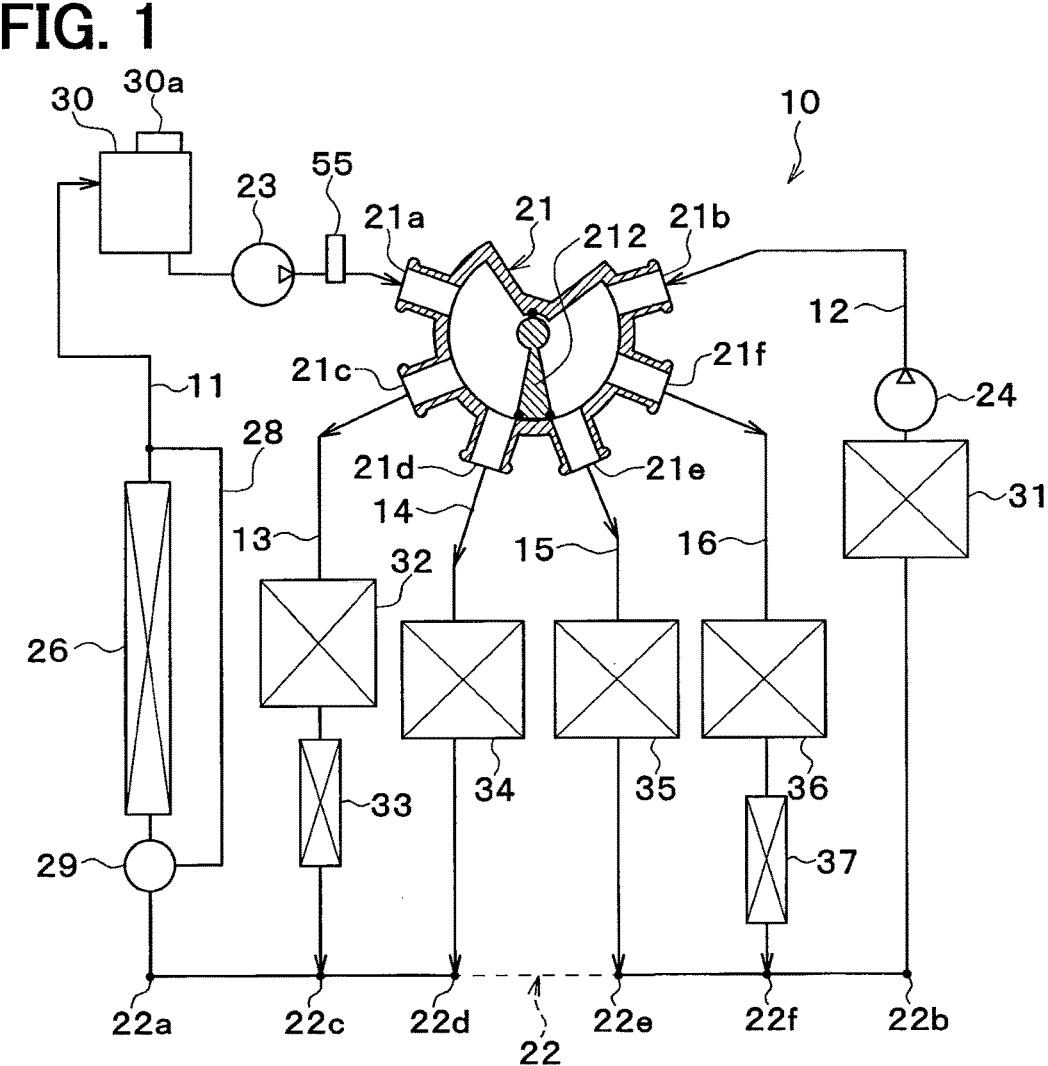
FIG. 1 is an entire configuration diagram of a thermal management system for a vehicle according to a first embodiment.

Now, a first embodiment of the invention will be described. A vehicle thermal management system 10 shown in FIG. 1 is used to cool various temperature adjustment target devices included in a vehicle (devices requiring cooling or heating) to an appropriate temperature.

In the embodiment, the thermal management system 10 is applied to a hybrid vehicle that can obtain the driving force for traveling from both an engine (internal combustion engine) and a motor for traveling.

The hybrid vehicle of the embodiment can switch between a traveling state (HV traveling) and another traveling state (EV traveling). In the HV traveling state, the vehicle travels by obtaining a driving force from both the engine and electric motor for traveling while the engine is operated or stopped according to a traveling load on the vehicle and a remaining electricity storage of a battery or the like. In the EV traveling state, the vehicle travels by obtaining a driving force only from the electric motor for traveling while the engine 10 is stopped. Thus, the hybrid vehicle of the embodiment can improve the fuel efficiency as compared to the vehicle with only the engine as a drive source for traveling.

The hybrid vehicle of the embodiment is configured as a plug-in hybrid vehicle that can charge the battery (vehicle-mounted battery) mounted on the vehicle, with power supplied from an external power source (commercial power source) during stopping of the vehicle. For example, a lithium ion battery can be used as the battery.

A driving force output from an engine is used not only for traveling of the vehicle, but also for operating a generator. Power generated by the generator and power supplied from the external power source can be stored in the battery. The power stored in the battery can be supplied not only to the motor for traveling, but also to various vehicle-mounted devices, such as electric components included in a cooling system.

As shown in FIG. 1, the thermal management system 10 includes numerous flow paths 11 to 16, a switching valve 21, a flow path 22 for collection and distribution (communication flow path), a first pump 23, a second pump 24, and a radiator 26 (first heat exchanger).

The numerous flow paths 11 to 16 are coolant flow paths through which the coolant flows. The numerous flow paths 11 to 16 are formed of a solid pipe made of resin material (nylon, polyphthalamide, or the like), metal material (SUS), etc., a hose pipe made of rubber material (EPDM), or the like.

The coolant is a fluid as the heat medium. In the first embodiment, a liquid containing at least ethylene glycol, dimethylpolysiloxane, or a nano-fluid is used as the coolant.

The numerous flow paths 11 to 16 have one end sides connected to the switching valve 21 in parallel to each other, and the other end sides connected to the flow path 22 for collection and distribution in parallel to each other.

The switching valve 21 has a first inlet 21a and a second inlet 21b into which the coolant flows, a first outlet 21c, a second outlet 21d, a third outlet 21e, and a fourth outlet 21f from which the coolant flows. The switching valve 21 is a switch for switching the communication state between the first and second inlets 21a and 21b and the first to fourth outlets 21c to 21f.

The first inlet 21a is connected to one end side of the first flow path 11 among the numerous flow paths 11 to 16. The second inlet 21b is connected to one end side of the second flow path 12 among the numerous flow paths 11 to 16.

The first outlet 21c is connected to one end side of the third flow path 13 among the numerous flow paths 11 to 16. The second outlet 21d is connected to one end side of the fourth flow path 14 among the numerous flow paths 11 to 16. The third outlet 21e is connected to one end side of the fifth flow path 15 among the numerous flow paths 11 to 16. The fourth outlet 21f is connected to one end side of the sixth flow path 16 among the numerous flow paths 11 to 16.

The flow path 22 for collection and distribution has a first outlet 22a and a second outlet 22b from which the coolant flows, and a first inlet 22c, a second inlet 22d, a third inlet 22e, and a fourth inlet 22f into which the coolant flows. The flow path 22 for collection and distribution is formed to establish communication between the first and second outlets 22a and 22b and the first to fourth inlets 22c to 22f.

The first outlet 22a is formed at one end of the flow path 22 for collection and distribution. The second outlet 22b is formed at the other end of the flow path 22 for collection and distribution. In the middle of the flow path 22 for collection and distribution, the first inlet 22c, the second inlet 22d, the third inlet 22e, and the fourth inlet 22f are formed from the one end (a side of the first outlet 22a) of the flow path 22 for collection and distribution toward the other end thereof (a side of the second outlet 22b) in that order.

The first outlet 22a is connected to the other end side of the first flow path 11 among the numerous flow paths 11 to 16. The second outlet 22b is connected to the other end side of the second flow path 12 among the numerous flow paths 11 to 16.

The first inlet 22c is connected to the other end side of the third flow path 13 among the numerous flow paths 11 to 16. The second inlet 22d is connected to the other end side of the fourth flow path 14 among the numerous flow paths 11 to 16. The third inlet 22e is connected to the other end side of the fifth flow path 15 among the numerous flow paths 11 to 16. The fourth inlet 22f is connected to the other end side of the sixth flow path 16 among the numerous flow paths 11 to 16.

Each of the first pump 23 and the second pump 24 is an electric pump for sucking and discharging the coolant. The first pump 23 is disposed in the first flow path 11 (first-pump arrangement flow path), and the second pump 24 is disposed in the second flow path 12 (second-pump arrangement flow path).

Both the first pump 23 and the second pump 24 are arranged to allow the coolant to be sucked from a side of the flow path 22 for collection and distribution toward a side of the switching valve 21.

The radiator 26 is a heat exchanger for heat dissipation (air-heat medium heat exchanger) that dissipates heat of the coolant into the outside air by exchanging the heat between the coolant and the air outside the vehicle compartment (hereinafter referred to as an outside air). The radiator 26 is disposed between the first pump 23 of the first flow path 11 and the flow path 22 for collection and distribution.

Although not shown in the figure, the radiator 26 is disposed at the foremost part of the vehicle. The outside air is blown to the radiator 26 by an exterior blower 27. During traveling of the vehicle, the radiator 26 can face the traveling air.

A part of the first flow path 11 on a side of the flow path 22 for collection and distribution, with respect to the radiator 26, is connected to one end side of a bypass flow path 28 via a three-way valve 29 (valve body). Another part of the first flow path 11 on the switching valve 21 side with respect to the radiator 26 is connected to the other end side of the bypass flow path 28. The three-way valve 29 switches between the flow of the coolant in the first flow path 11 into the radiator 26, and the flow of the coolant into the bypass flow path 28.

A reserve tank 30 is disposed between the radiator 26 and the first pump 23 in the first flow path 11. The reserve tank 30 is a sealed type container (heat medium storage portion) for storing the coolant therein. Excessive coolant is stored in the reserve tank 30, so that it can suppress the decrease in liquid amount of the coolant circulating through the respective flow paths. The reserve tank 30 has a function of separating the air bubbles mixed in the coolant, into gas and liquid.

A cap 30a of the reserve tank 30 is provided with a negative pressure valve and a pressurizing valve. The negative pressure valve is open when an inner pressure of the tank is equal to or less than atmospheric pressure. The pressurizing valve is open when an inner pressure of the tank becomes a preset pressure that is equal to or higher than atmospheric pressure. Thus, the inner pressure of the tank can be kept to the atmospheric pressure or more, and to the preset pressure or less.

In the second flow path 12, a chiller 31 (second heat exchanger) is disposed. The chiller 31 is a heat exchanger for coolant cooling (heat medium cooler) that cools the coolant by exchanging heat between the coolant and a low-pressure refrigerant (low-temperature refrigerant) of a refrigeration cycle 40.

In the third flow path 13 (temperature-adjustment target-device arrangement flow path), a condenser 32 and a heater core 33 which are temperature adjustment target devices are arranged in series with each other. The condenser 32 is a heat exchanger for coolant heating (heat medium heater) that heats the coolant by exchanging heat between the coolant and a high-pressure refrigerant (high-temperature refrigerant) of the refrigeration cycle 40. The heater core 33 is a heat exchanger for air heating (air-heat medium heat exchanger) that heats the air by exchanging heat between the coolant heated by the condenser 32 and the air (ventilation air) blowing into the vehicle compartment.

In the fourth flow path 14 (temperature-adjustment target-device arrangement flow path), an oil heat exchanger 34 as the temperature adjustment target device is disposed. The oil heat exchanger 34 is a heat exchanger for oil temperature adjustment (oil temperature adjustment portion) that cools or heats oil by exchanging heat between the coolant and oil, such as an engine oil (lubricant oil used in an engine) or ATF oil.

In the fifth flow path 15 (temperature-adjustment target-device arrangement flow path), an inverter 35 as the temperature adjustment target device is disposed. The inverter 35 is a power conversion device that converts a direct-current (DC) power supplied from the battery to an alternating-current (AC) power to output the AC power to an electric motor for traveling, thereby constituting a power control unit.

The power control unit is a component for controlling the output from the battery so as to drive the motor for traveling. The power control unit includes a boost converter for increasing the voltage of the battery, in addition to the inverter 35.

Inside the inverter 35, a coolant flow path for allowing the coolant to flow therethrough is formed, whereby the inverter 35 is cooled by flowing the coolant in the coolant flow path. An allowable temperature of the inverter 35 (upper limit temperature of the coolant flowing through the inverter 35) is set to 50° C. for the purpose of preventing heat damage or degradation of a semiconductor element therein, or the like.

In the sixth flow path 16 (temperature-adjustment target-device arrangement flow path), a heat exchanger 36 for the battery (battery cooler) and a supercooling heat exchanger 37 which are temperature adjustment target devices are arranged in series with each other. The heat exchanger 36 for the battery is a heat exchanger for exchanging heat between the coolant (heat medium) and air. The air having exchanged heat in the heat exchanger 36 for the battery is guided to the battery, thereby cooling or heating the battery. An allowable temperature of the heat exchanger 36 for the battery (upper limit temperature of the coolant flowing through the heat exchanger 36 for the battery) is set to 40° C. for the purpose of preventing reduction in power from the battery, and reduction in charging efficiency of the battery, and degradation of the battery or the like.

Because the battery is covered with thermal insulating material, it can prevent the heat inside the battery (hot heat and cold heat) from escaping outward. The plug-in hybrid vehicle or electric vehicle has lots of batteries loaded thereon so as to be capable of ensuring a long traveling distance, and thus can have a large heat capacity of the entire battery, and further can store heat (hot heat and cold heat) in a large amount. Thus, the battery constitutes a heat accumulator for storing hot heat, and a cold accumulator for storing cold heat.

Instead of the heat exchanger 36 for the battery, the battery itself may be disposed in the sixth flow path 16, and the coolant may flow through the coolant flow path (battery cooling portion) formed inside the battery, thereby cooling the battery.

The supercooling heat exchanger 37 is a heat exchanger for refrigerant supercooling (refrigerant heat medium heat exchanger) that further cools the refrigerant to increase a supercooling degree of the refrigerant by exchanging heat between the refrigerant cooled by the condenser 32 and the coolant.

In the first embodiment, the magnitude relationship among the allowable temperatures of the temperature adjustment target devices 32 to 37 disposed in the third to sixth flow paths 13 to 16 is as follows. The allowable temperature of each of the temperature adjustment target devices 32 and 33 disposed in the third flow path 13 is equal to or higher than that of the temperature adjustment target device 34 disposed in the fourth flow path 14. The allowable temperature of the temperature adjustment target device 34 disposed in the fourth flow path 14 is equal to or higher than that of the temperature adjustment target device 35 disposed in the fifth flow path 15. The allowable temperature of the temperature adjustment target device 35 disposed in the fifth flow path 15 is equal to or higher than that of the temperature adjustment target device 36 disposed in the sixth flow path 16.

In other words, the allowable temperatures of the temperature adjustment target devices 32 to 37 disposed in the third to sixth flow paths 13 to 16 become equal to each other, or lower in the order from one end side (on the side of the third flow path 13) of the flow path 22 for collection and distribution toward the other end side (on the side of the sixth flow path 16).

Figure 2:
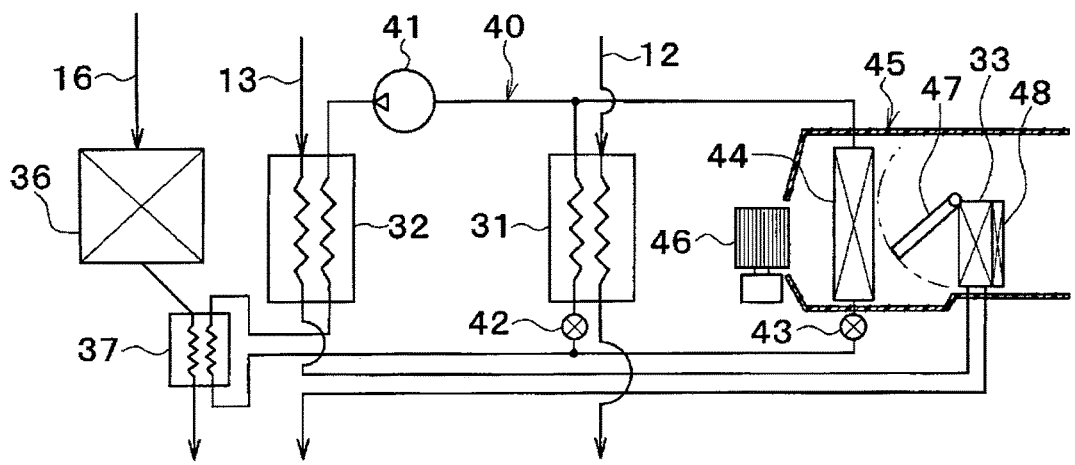
FIG. 2 is a configuration diagram of a refrigeration cycle or the like in the first embodiment.

As shown in FIG. 2, the refrigeration cycle 40 includes not only the chiller 31 as a low-pressure side heat exchanger, the condenser 32 and supercooling heat exchanger 37 as a high-pressure side heat exchanger, but also a compressor 41, an expansion valve 42 for the chiller, an expansion valve 43 for an evaporator, and an evaporator 44.

The refrigeration cycle 40 is a vapor compression refrigerator. The refrigeration cycle 40 of the first embodiment employs a fluorocarbon refrigerant as the refrigerant, and forms a subcritical refrigeration cycle whose high-pressure side refrigerant pressure does not exceed the critical pressure of the refrigerant.

The compressor 41 is an electric compressor driven by an electric power supplied from the battery. The compressor 41 is adapted to suck gas-phase refrigerant and to compress and discharge the refrigerant. The compressor 41 may be rotatably driven by the engine via a pulley, a belt, and the like. The high-temperature and high-pressure gas-phase refrigerant discharged from the compressor 41 exchanges heat with the coolant by the condenser 32 to have its heat absorbed to be condensed.

The expansion valve 42 for the chiller is a decompressor that decompresses and expands a liquid-phase refrigerant supercooled by the supercooling heat exchanger 37. The refrigerant decompressed and expanded by the expansion valve 42 for the chiller is cooled by exchanging heat with the coolant in the chiller 31. The gas-phase refrigerant absorbing heat from the coolant in the chiller 31 to evaporate is sucked into and compressed by the compressor 41.

The expansion valve 43 for the evaporator and the evaporator 44 are arranged in parallel with respect to the expansion valve 42 for the chiller and the chiller 31 in the refrigeration cycle 40. The expansion valve 43 for the evaporator is a decompressor that decompresses and expands a liquid-phase refrigerant supercooled by the supercooling heat exchanger 37.

The evaporator 44 is a heat exchanger for air cooling that cools the air by exchanging heat between the air blown into the vehicle compartment and the refrigerant decompressed and expanded by the expansion valve 43 for the evaporator. The gas-phase refrigerant absorbing heat from the coolant in the evaporator 44 to evaporate is sucked into and compressed by the compressor 41.

The chiller 31 cools the coolant by the low-pressure refrigerant in the refrigeration cycle 40, and thus can cool the coolant to a lower temperature as compared to the radiator 26 for cooling the coolant with the outside air.

Specifically, the radiator 26 cannot cool the coolant to a temperature lower than that of the outside air, whereas the chiller 31 can cool the coolant to a temperature lower than that of the outside air.

The evaporator 44 and the heater core 33 are disposed in an air passage formed inside a casing 45 of an interior air conditioning unit. Specifically, in the air passage within the casing 45, the heater core 33 is disposed on the downstream side of the air flow with respect to the evaporator 44.

Through the air passage within the casing 45, the air blown by an interior blower 46 flows. An air mix door 47 is disposed in between the evaporator 44 and the heater core 33 within the casing 45. The air mix door 47 serves as an air volume ratio adjuster that adjusts a ratio of the air volume of the air passing through the heater core 33 to that of air bypassing the evaporator 44.

A PCT heater 48 is disposed on the downstream side of the air flow of the heater core 33 within the casing 45. The PTC heater 48 is an electric heater having a PTC element (positive thermistor), and serving as auxiliary heating means for heating air having passed through the heater core 33 by supplying power to the PTC element to generate heat.

Figure 3:
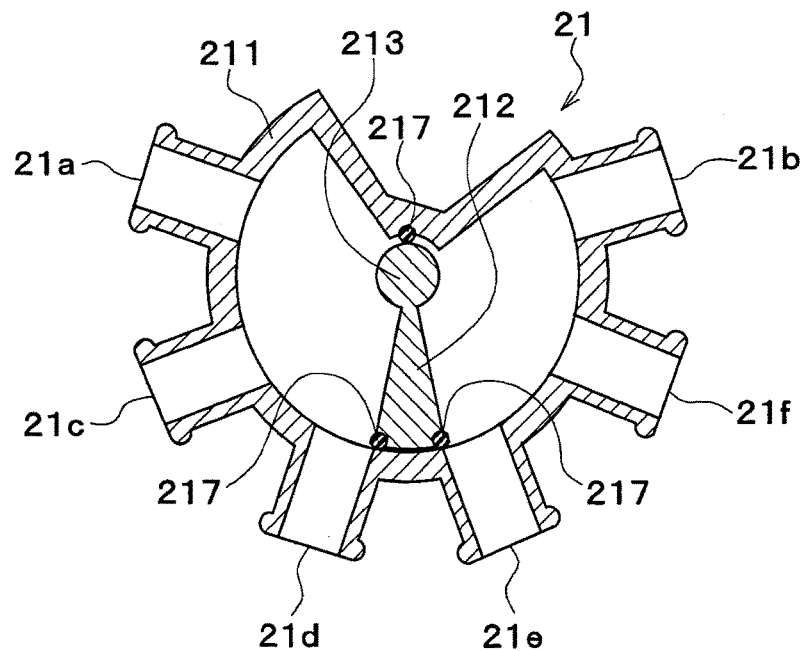
FIG. 3 is a cross-sectional view showing a switching valve shown in FIG. 1.

Next, the details of the switching valve 21 will be described with reference to FIGS. 3 to 5. As shown in FIG. 3, the switching valve 21 includes a housing 211 with the coolant flow path formed therein, a valve body 212 accommodated in the housing 211, and a rotary shaft 213 fixed to the valve body 212.

Figure 4:
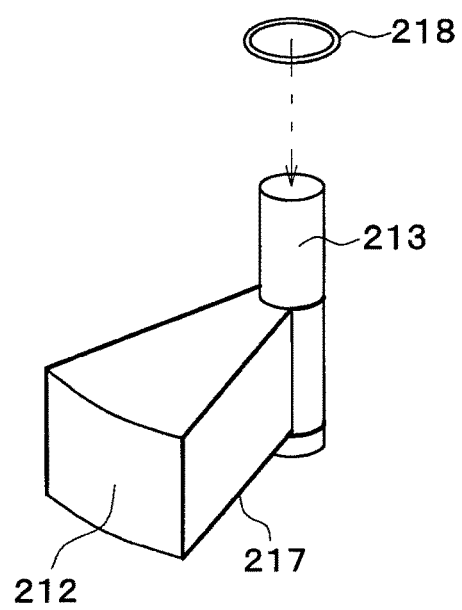
FIG. 4 is a perspective view showing a valve body shown in FIG. 3.
Figure 5:
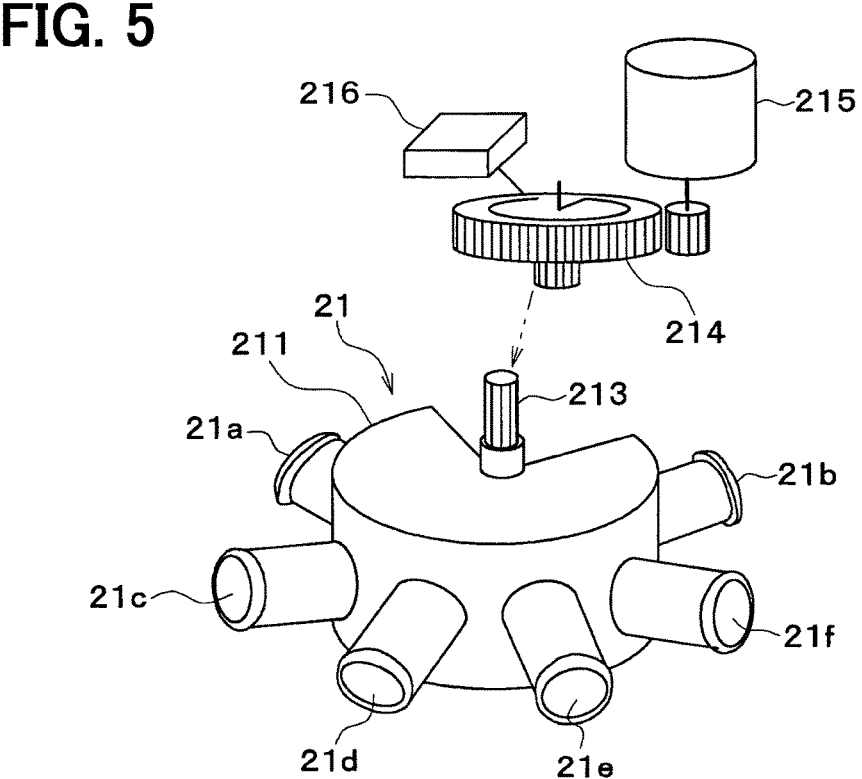
FIG. 5 is a perspective view showing the switching valve shown in FIG. 1.

As shown in FIG. 4, the valve body 212 is formed in a plate-like shape that partitions an internal space of the housing 211 into two spaces. As shown in FIG. 5, the rotary shaft 213 protrudes toward the outside of the housing 211, and is coupled to a gear mechanism 214 and an electric actuator 215.

The valve body 212 is driven to rotate around the rotary shaft 213 by transferring the rotary driving force of the electric actuator 215 to the rotary shaft 213 via the gear mechanism 214. Instead of the gear mechanism 214, a pulley mechanism, a crank mechanism, a link mechanism, or the like may be used.

The rotation angle of the valve body 212 is detected by a rotation angle detector 216, such as a potentiometer. In this example, the rotation angle detector 216 detects the rotation angle of the gear mechanism 214, whereby the rotation angle of the valve body 212 can be detected.

The housing 211 are provided with the first inlet 21a, first outlet 21c, second outlet 21d, third outlet 21e, fourth outlet 21f, and second inlet 21b that are arranged in that order along the rotational direction of the valve body 212. Thus, the communication states between the first and second inlets 21a and 21b and the first to fourth outlets 21c to 21f are switched depending on the position of the rotated valve body 212. For example, when the valve body 212 is rotated to the position shown in FIG. 3, the first inlet 21a communicates with the first and second outlets 21c and 21d, whereas the second inlet 21b communicates with the third and fourth outlets 21e and 21f.

As shown in FIG. 4, the valve body 212 is provided with a seal member 217 for preventing the leakage of the coolant from the inside of the switching valve 21. An O-ring 218 is disposed at the rotary shaft 213 so as to prevent the leakage of the coolant toward the outside of the housing 211.

The seal member 217 and O-ring 218 are formed of rubber member (e.g., ethylene-propylene-diene copolymer rubber (EPDM), fluoro-rubber, silicon rubber, and the like) having the resistance to the coolant. The seal member 217 and the O-ring 218 undergo the surface treatment taking into consideration friction due to rotation of the valve body 212.

Figure 6:
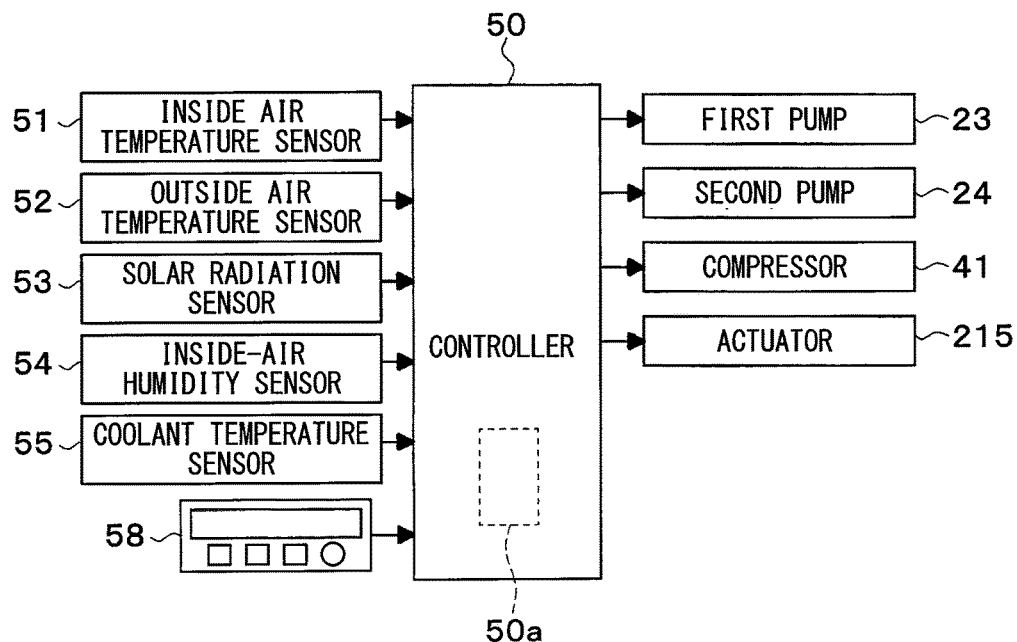
FIG. 6 is a block diagram showing an electric controller in the thermal management system for a vehicle shown in FIG. 1.

Next, an electric controller of the thermal management system 10 will be described with reference to FIG. 6. A controller 50 is comprised of a known microcomputer, including CPU, ROM, RAM, and the like, and a peripheral circuit thereof. The controller 50 is a control device for controlling the operations of the devices connected to the output side, including the first pump 23, the second pump 24, the compressor 41, the electric actuator 215 for the switching valve 21, and the like by performing various kinds of computations and processing based on air conditioning control programs stored in the ROM.

The controller 50 is integrally structured with a control unit for controlling various control target devices connected to the output side of the controller. The control unit for controlling the operation of each of the control target devices includes a structure (hardware and software) adapted to control the operation of each of the control target devices.

In the embodiment, particularly, the structure (hardware and software) that controls the operation of the electric actuator 215 for the switching valve 21 acts as a switching valve controller 50a. Obviously, the switching valve controller 50a may be independently provided from the controller 50.

Detection signals from an inside-air temperature sensor 51, an outside-air temperature sensor 52, a solar radiation sensor 53, an inside-air humidity sensor 54, a coolant temperature sensor 55, and the like are input to an input side of the controller 50.

The inside-air temperature sensor 51 is a detector (inside-air temperature detector) for detecting the temperature of inside air (or the temperature of the vehicle interior). The outside-air sensor 52 is a detector (i.e. outside-air temperature detector) for detecting the temperature of outside air. The solar radiation sensor 53 is a detector (solar radiation amount detector) for detecting the amount of solar radiation onto the vehicle interior. The inside-air humidity sensor 54 is a detector (humidity detector) for detecting the humidity of the vehicle interior.

A coolant temperature sensor 55 is a detector (temperature detector) for detecting the temperature of the coolant in the first flow path 11 (first-pump arrangement flow path). In this example, as shown in FIG. 1, the coolant temperature sensor 55 is disposed in a position on a discharge side of the first pump 23 in the first flow path 11.

An operation panel 58 is disposed near an instrument board at the front of the vehicle compartment. Operation signals are input from various types of air conditioning operation switches provided on the operation panel 58, to the input side of the controller 50. The various types of air conditioning operation switches provided in the operation panel 58 include an air conditioner switch, an automatic switch, an air volume setting switch, a vehicle-interior temperature setting switch, and the like.

The air conditioner switch is a switch for switching between operating and stopping (on, off) of air conditioning (cooling or heating). The automatic switch is a switch for setting or resetting automatic control of the air conditioning. The air volume setting switch is a switch for setting the volume of air from the interior blower. The vehicle-interior temperature setting switch serves as target temperature setting means for setting a target vehicle interior temperature by a passenger's operation.

Now, the operation of the above-mentioned structure will be described.

The controller 50 controls the operation of the electric actuator 215 for the switching valve 21 to switch among various kinds of operation modes.

Specifically, the first flow path 11 and at least one of the third to sixth flow paths 13 to 16 form a first coolant circulation circuit (first heat medium circuit). The second flow path 12 and the remaining flow path among the third to sixth flow paths 13 to 16 form a second coolant circulation circuit (second heat medium circuit).

In each of the third to sixth flow paths 13 to 16, switching can be performed between the connection to the first coolant circulation circuit and the connection to the second coolant circulation circuit depending on the situation, thereby adjusting each temperature adjustment target device to an appropriate temperature.

Alternatively, one or some of the third to sixth flow paths 13 to 16 may be connected to both the first coolant circulation circuit and the second coolant circulation circuit, thereby allowing a mixture of the coolant in the first coolant circulation circuit and the coolant in the second coolant circulation circuit to flow therethrough.

Only one of the first and second coolant circulation circuits may be formed.

Figure 7:
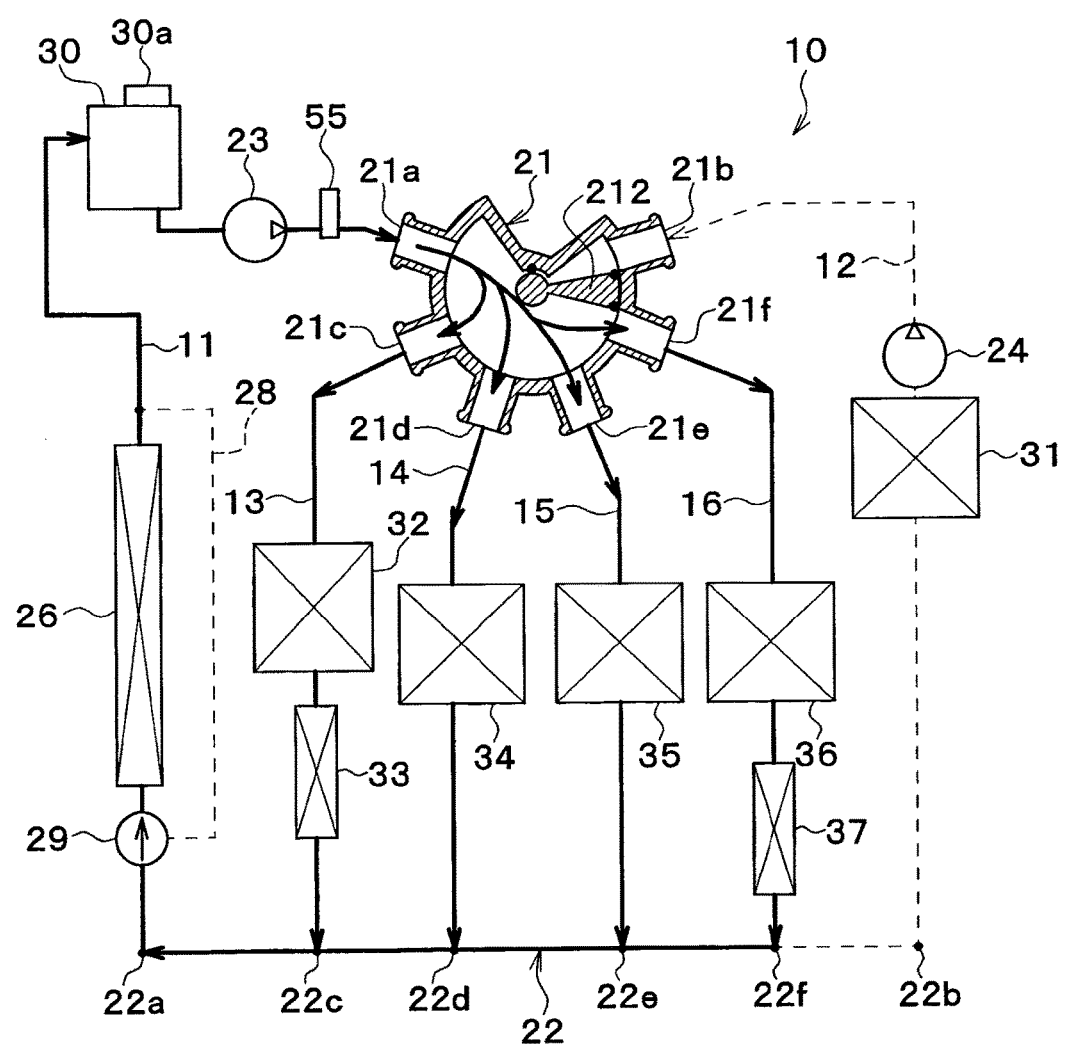
FIG. 7 is an entire configuration diagram showing a first operation mode of the thermal management system for a vehicle shown in FIG. 1.

The first operation mode shown in FIG. 7 is performed when the coolant temperature detected by the coolant temperature sensor 55 is lower than an allowable temperature (40° C.) of the heat exchanger 36 for the battery. That is, when the outside air temperature is not relatively high (for example, 10 to 30° C.), the first operation mode is performed.

In the first operation mode, the valve body 212 of the switching valve 21 is rotated to a position between the fourth outlet 21f and the second inlet 21b. Thus, the first, third, fourth, fifth, and sixth flow paths 11, 13, 14, 15, and 16 communicate with each other to thereby form the first coolant circulation circuit indicated by thick solid lines of FIG. 7. The second flow path 12 does not communicate with other flow paths, so that the second coolant circulation circuit is not formed. Thus, the second pump 24 is stopped.

In the first coolant circulation circuit, the coolant circulates among the radiator 26, condenser 32, heater core 33, oil heat exchanger 34, inverter 35, and heat exchanger 36 for the battery, so that waste heat from the condenser 32, oil heat exchanger 34, inverter 35, and heat exchanger 36 for the battery is recovered in the coolant, and thus can be dissipated into the outside air by the radiator 26.

Figure 8:
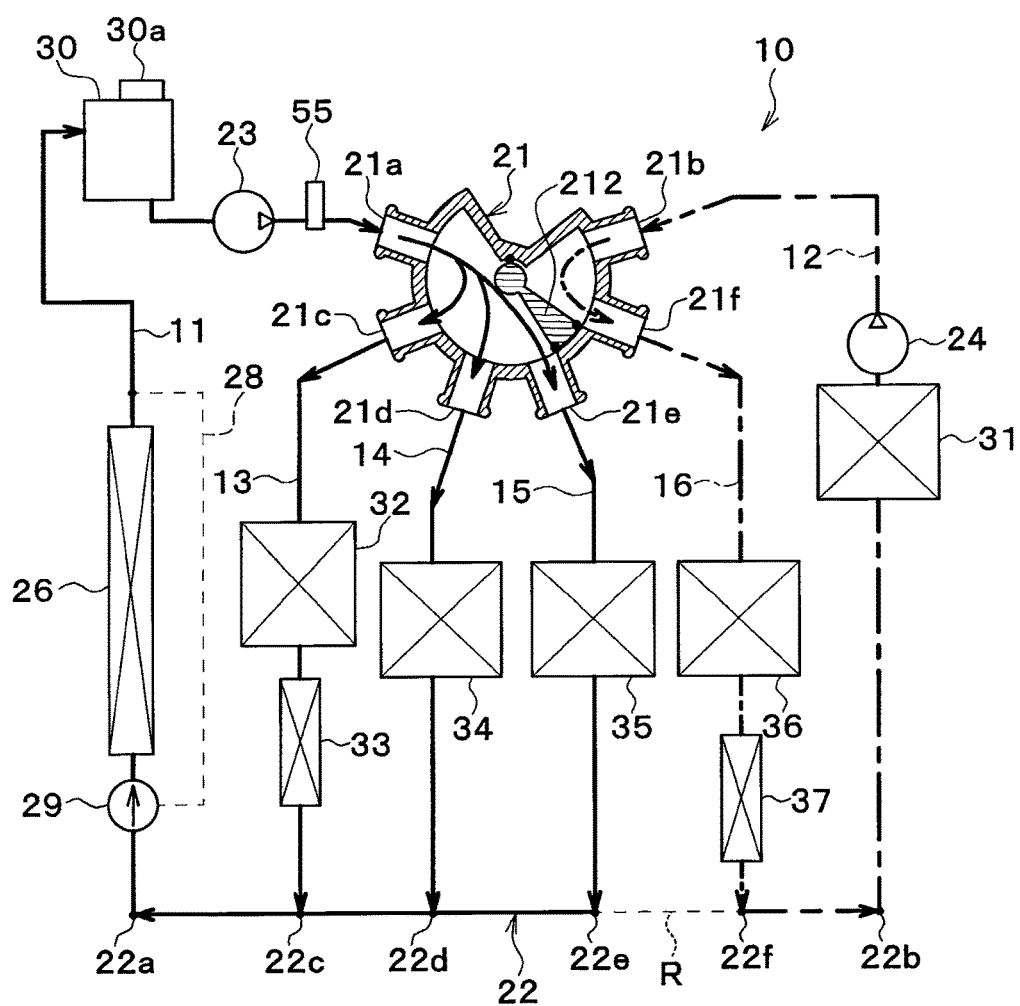
FIG. 8 is an entire configuration diagram showing a second operation mode of the thermal management system for a vehicle shown in FIG. 1.

A second operation mode shown in FIG. 8 is performed when the coolant temperature detected by the coolant temperature sensor 55 is equal to or higher than the allowable temperature (40° C.) of the heat exchanger 36 for the battery, and lower than an allowable temperature (50° C.) of the inverter 35.

In the second operation mode, the valve body 212 of the switching valve 21 is rotated to a position between the third outlet 21e and the fourth outlet 21f. In this way, the first, third, fourth, and fifth flow paths 11, 13, 14, and 15 communicate with each other to thereby form the first coolant circulation circuit indicated by thick solid lines of FIG. 8, whereas the second and sixth flow paths 12 and 16 communicate with each other to thereby form the second coolant circulation circuit indicated by thick alternate long and short dash lines of FIG. 8.

As indicated by a broken line of FIG. 8, the part of the flow path 22 for collection and distribution between the third inlet 22e and the fourth inlet 22f forms a communication part R that establishes communication between the first coolant circulation circuit and the second coolant circulation circuit.

The communication part R does not allow the coolant to constantly flow therethrough. The reason for the above description will be given below.

Provided that the coolant constantly flows through the communication part R, a route for the coolant having passed through the communication part R to return (return route) is necessary. However, in any other part except for the communication part R, the coolant having passed through the communication part R cannot return as the first coolant circulation circuit does not communicate with the second coolant circulation circuit. Therefore, the coolant never constantly flows through the communication part R.

Note that in a transitory stage, such as the start of operations of the first pump 23 and the second pump 24, the coolant can slightly flow through the communication part R because of a pressure equalization phenomenon of both the coolant circulation circuits.

Specifically, the second operation mode is performed in the following case. For example, in the case where the refrigeration cycle 40 is operated for cooling under high temperature of outside air in summer or the like, the coolant temperature of the first coolant circulation circuit can often exceed the allowable temperature (40° C.) of the heat exchanger 36 for the battery when the amount of heat dissipation from the condenser 32 is large, or when the amount of heat dissipation from the inverter 35 or oil heat exchanger 34 is large during traveling at high load.

In those cases, when the second operation mode is performed to cause the heat exchanger 36 for the battery to communicate with the chiller 31, it can maintain the heat exchanger 36 for the battery to the allowable temperature or lower. The heat exchanger 36 for the battery can also be cooled to the outside air temperature or lower.

In the second operation mode, the flow rate from the second pump 23 is preferably adjusted to thereby adjust the flow rate of coolant required for cooling the battery.

When the battery is charged with electric power supplied from an external power source (commercial power source), the second operation mode can be performed to store cold heat in the battery during the charging of the battery. The cold heat stored in the battery is used to supercool the refrigerant at the supercooling heat exchanger 37 after start of traveling to significantly improve the operating efficiency of the refrigeration cycle 40, thereby enabling the energy saving cooling.

Figure 9:
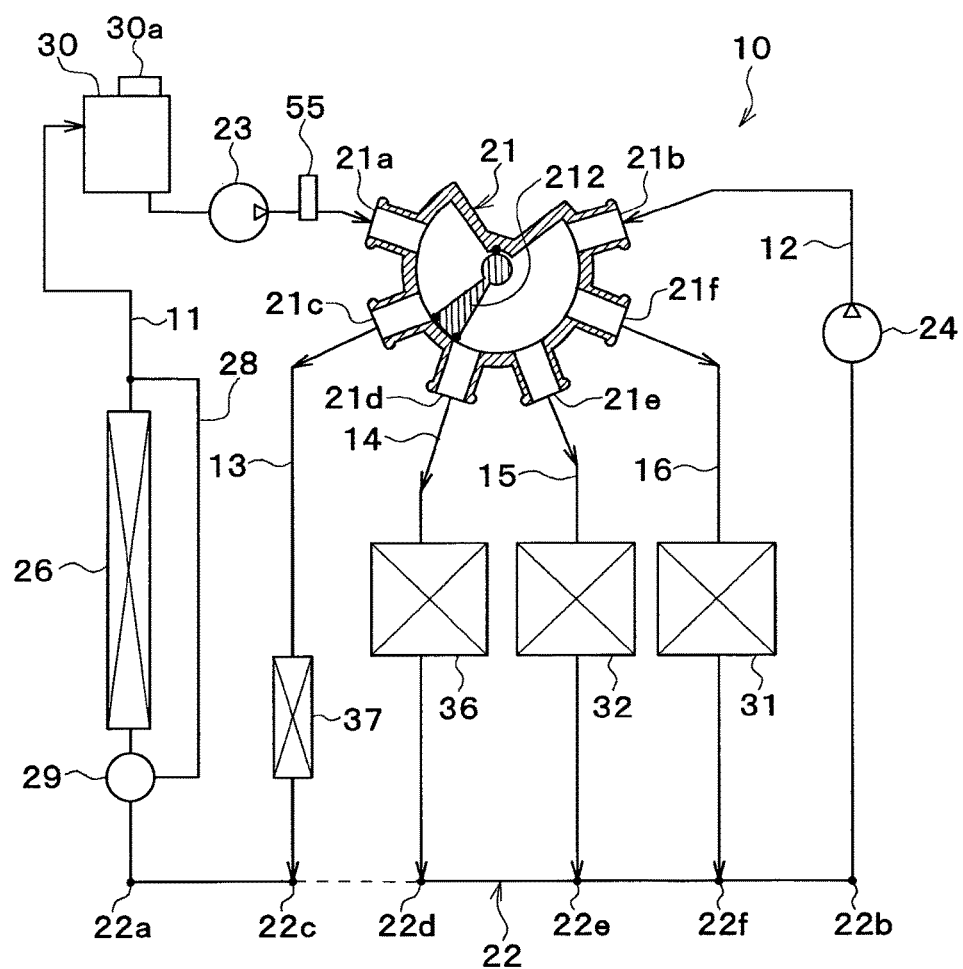
FIG. 9 is an entire configuration diagram showing an operation mode of the thermal management system for a vehicle when storing cold heat in a battery.
Figure 10:
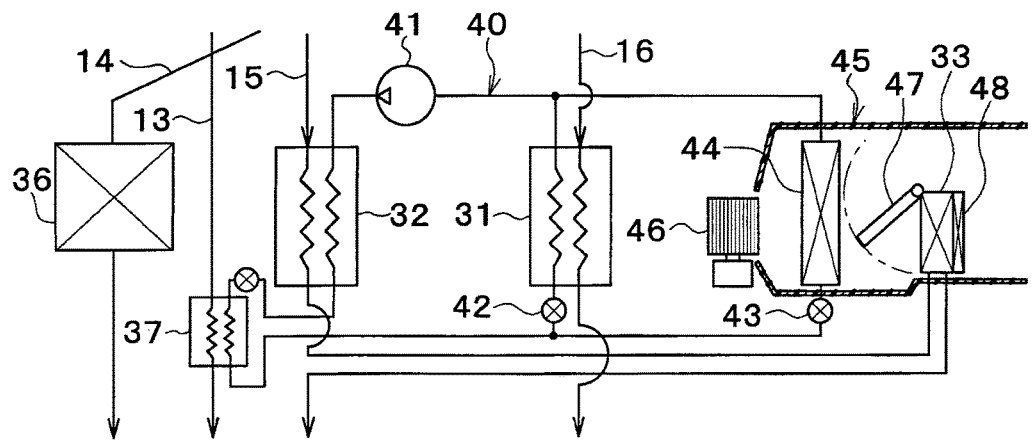
FIG. 10 is a configuration diagram of a refrigeration cycle or the like in the operation mode shown in FIG. 9.

For example, when the cold heat is stored in the cold accumulator (battery) 103, as shown in FIG. 9, the supercooling heat exchanger 37, the heat exchanger 36 for the battery, the condenser 32, and the chiller 31 are disposed in the third flow path 13, the fourth flow path 14, the fifth flow path 15, and the sixth flow path 16, respectively. Further, as shown in FIG. 10, the chiller 31, the condenser 32, and the supercooling heat exchanger 37 configure parts of the refrigeration cycle 40. The valve body 212 of the switching valve 21 is rotated to a position between the first outlet 21c and the second outlet 21d. A water-cooled battery shown in FIG. 12, or a battery module 100 using an air-cooled battery shown in FIGS. 13A and 13B may be used as the battery 103.

Figure 13A:
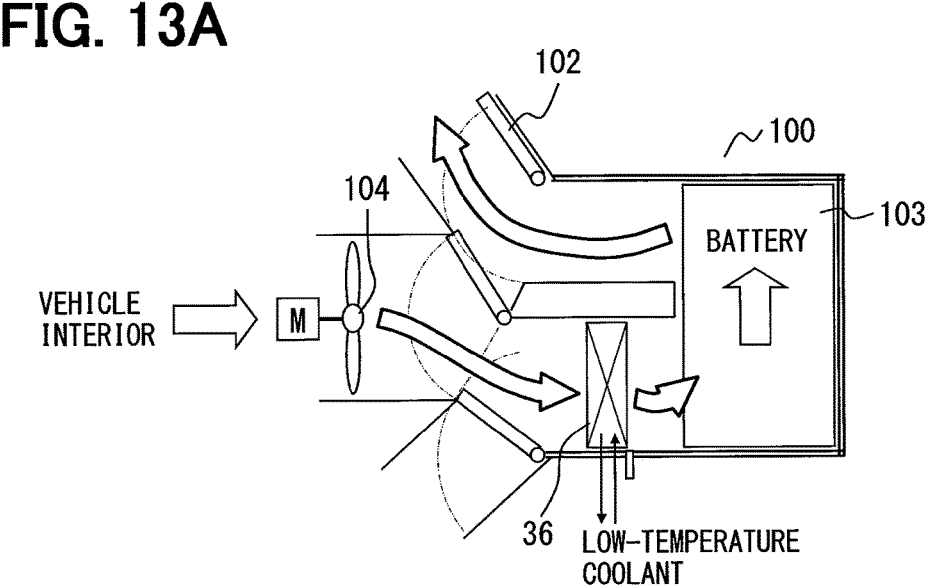
FIG. 13A is a schematic diagram showing an operation of a battery module when storing the cold heat in the battery.

When the cold heat is stored in the battery 103 using a battery module 100, an air path switching door 102 is rotated as shown in FIG. 13A, so that the heat exchanger 36 for the battery exchanges heat between the inside air blown by a blower 104 and a low-temperature coolant cooled by the chiller 31 in the second coolant circulation circuit, thereby cooling the inside air. Thus, the battery 103 is cooled by the cooled inside air to store therein the cold heat.

Figure 11:
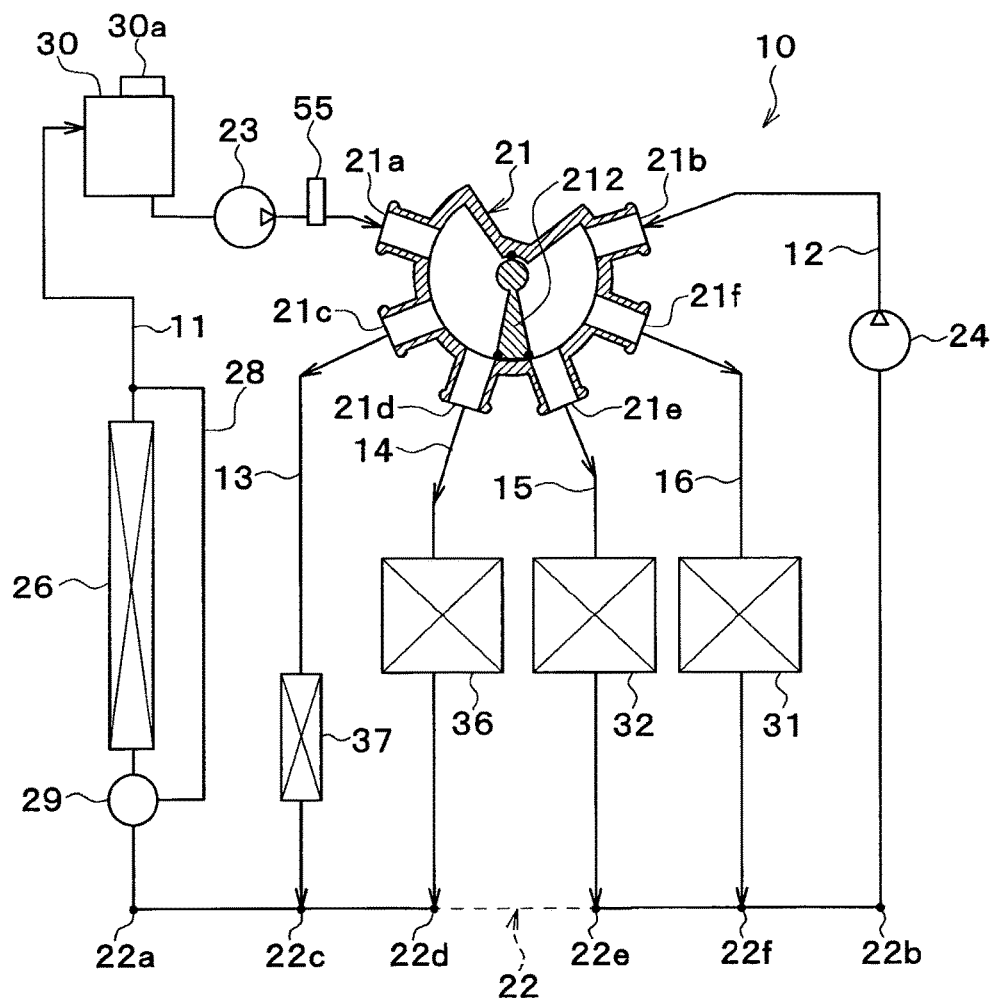
FIG. 11 is an entire configuration diagram showing an operation mode of the thermal management system for a vehicle when recovering the cold heat stored in the battery.
Figure 13B:
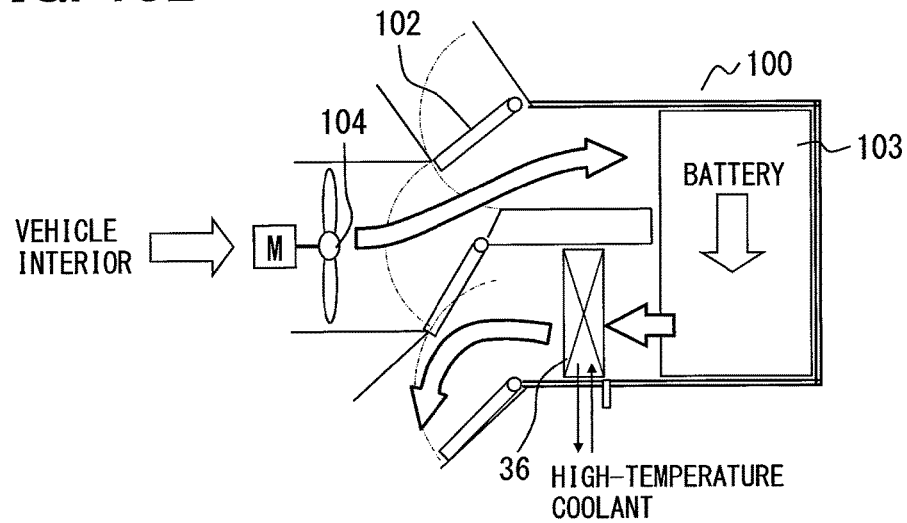
FIG. 13B is a schematic diagram showing an operation of the battery module when recovering the cold heat stored in the battery.

In use of the cold heat stored in the battery 103, as shown in FIG. 11, the valve body 212 of the switching valve 21 is rotated to the position between the second outlet 21*d* and the third outlet 21*e*. Further, the air path switching door 102 of the battery module 100 is rotatably driven as shown in FIG. 13B. Thus, the heat exchanger 36 for the battery exchanges heat between the inside air having passed through the battery 103 that stores therein the cold heat, and the high-temperature coolant that recovers waste heat from the device in the first coolant circulation flow path, thereby recovering the cold heat stored in the battery 103.

Figure 12:
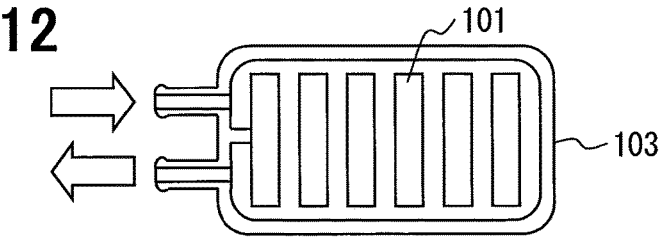
FIG. 12 is a schematic diagram showing one example of the battery storing the cold heat therein.

A battery 103 shown in FIG. 12 uses a battery cell 101 as a cold accumulator, but may use paraffin, hydrate, or a latent-heat cold storage agent, instead of the battery cell 101.

When supercooling the refrigerant by the supercooling heat exchanger 37 using the cold heat stored in the battery, the expansion valve 42 for the chiller is preferably completely closed not to allow the flow of the refrigerant through the chiller 31.

Figure 14:
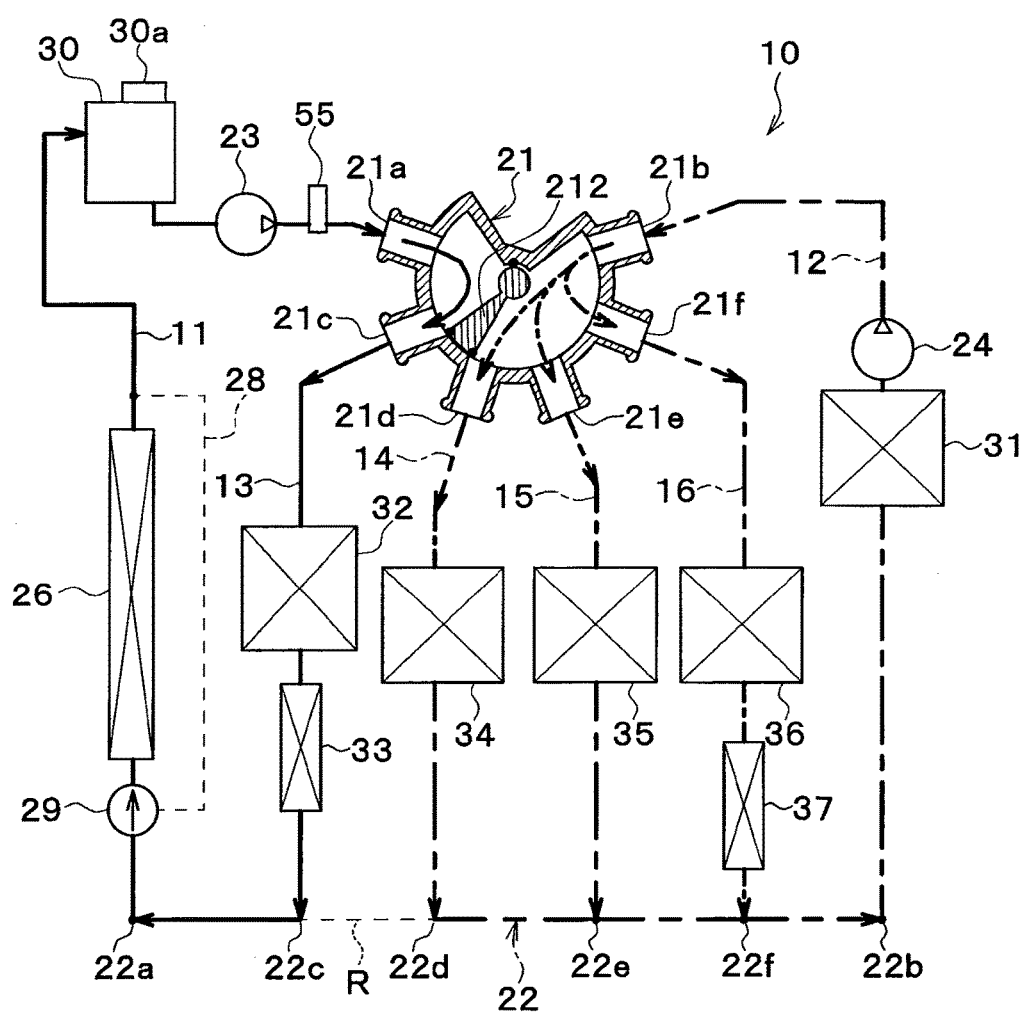
FIG. 14 is an entire configuration diagram showing a third operation mode of the thermal management system for a vehicle shown in FIG. 1.

A third operation mode shown in FIG. 14 is performed when the coolant temperature detected by the coolant temperature sensor 55 is equal to or higher than the allowable temperature (50° C.) of the inverter 35.

In the third operation mode, the valve body 212 of the switching valve 21 is rotated to a position between the first outlet 21*c* and the second outlet 21*d*. In this way, the first and third flow paths 11 and 13 communicate with each other to thereby form the first coolant circulation circuit indicated by thick solid lines of FIG. 14, whereas the second, fourth, fifth, and sixth flow paths 12, 14, 15, and 16 communicate with each other to thereby form the second coolant circulation circuit indicated by thick alternate long and short dash lines of FIG. 14.

Thus, the inverter 35 and the oil heat exchanger 34 communicate with the chiller 31, so that the inverter 35 can be maintained at the allowable temperature or lower. The inverter 35 can also be cooled to the outside air temperature or lower.

As the temperature of coolant flowing through the inverter 35 is decreased, the size of the inverter 35 can be reduced. The reason for the above description will be given below.

As the size of a power control element within the inverter 35 is reduced, the density of generated heat becomes higher, increasing the temperature of the element. In order to prevent the degradation of the element or the heat damage to the element, a water-cooling system is adopted to remove the heat from the element using the coolant, and thereby it can improve the heat dissipation performance of the element as compared to the air-cooling system. As the coolant temperature becomes lower, a difference in temperature from the element can be ensured, thereby improving the amount of heat transfer. Thus, as the temperature of the coolant flowing through the inverter 35 becomes lower, the size of the power control element within the inverter 35 can be reduced.

Figure 15:
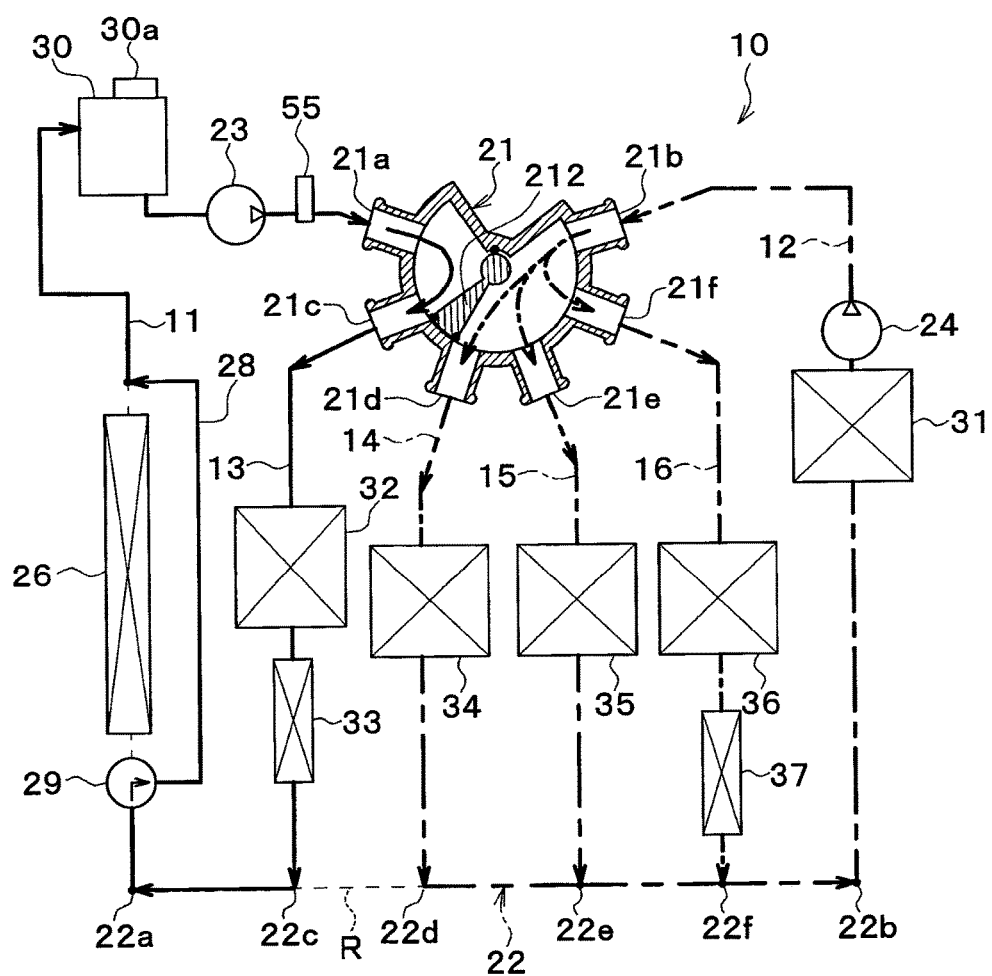
FIG. 15 is an entire configuration diagram showing a fourth operation mode of the thermal management system for a vehicle shown in FIG. 1.

A fourth operation mode shown in FIG. 15 is performed when heating is necessary, for example, in winter or the like. The fourth operation mode differs from the above-mentioned third mode in operation of the three-way valve 29. Specifically, the three-way valve 29 is switched such that the heat medium in the first flow path 11 does not flow through the radiator 26, but through the bypass flow path 28.

With the arrangement, the waste heat from the oil heat exchanger 34, the inverter 35, and the heat exchanger 36 for the battery is recovered by the chiller 31. The heat is pumped up toward the condenser 32 by a heat pump operation of the refrigeration cycle 40, and transferred from the condenser 32 to the coolant. In the heater core 33, the heat is exchanged between the vehicle interior air (inside air) and the coolant, thereby heating the vehicle interior.

In a plug-in hybrid vehicle or an electric vehicle that can charge a battery with a commercial power source, the hot heat is stored in the battery during the charging when the outside air temperature is equal to or lower than a predetermined outside air temperature, or when heating is determined to be necessary after charging.

Whether or not the heating is necessary after the charging of the battery can be determined, for example, in the following way. A device connectable to a network is mounted on a vehicle or a charger. The device is provided to obtain information on weather forecast from the network, and to predict outside air conditions after the charging of the battery based on the obtained information on weather forecast. In this way, a logic is provided on the vehicle side for predicting the outside air temperature conditions after the charging of the battery from changes in outside air temperature, and time and date, so that it can determine whether the heating is necessary or not after the charging.

By storing the hot heat in the battery, a heat pump cycle can be performed in which the hot heat stored in the battery during traveling is recovered by the chiller 31 and then dissipated from the condenser 32. In this case, because the temperature of the coolant in the chiller 31 becomes higher, it enables the very effective refrigeration cycle operation. As a result, heating with energy saving can be achieved, so that the traveled distance with only the battery can be drastically increased.

Even after the hot heat stored in the battery is exhausted, the heat pump heating which involves pumping up the waste heat from the oil heat exchanger 34 or inverter 35 can be performed to thereby achieve the heating with energy saving, as compared to the heating with only the electric heater. When the waste heat from the oil heat exchanger 34 and the inverter 35 cannot be compensated for the heat amount required for heating because of a high heating load, the PTC heater 48 can be energized to ensure the heat amount required for the heating.

Figure 16:
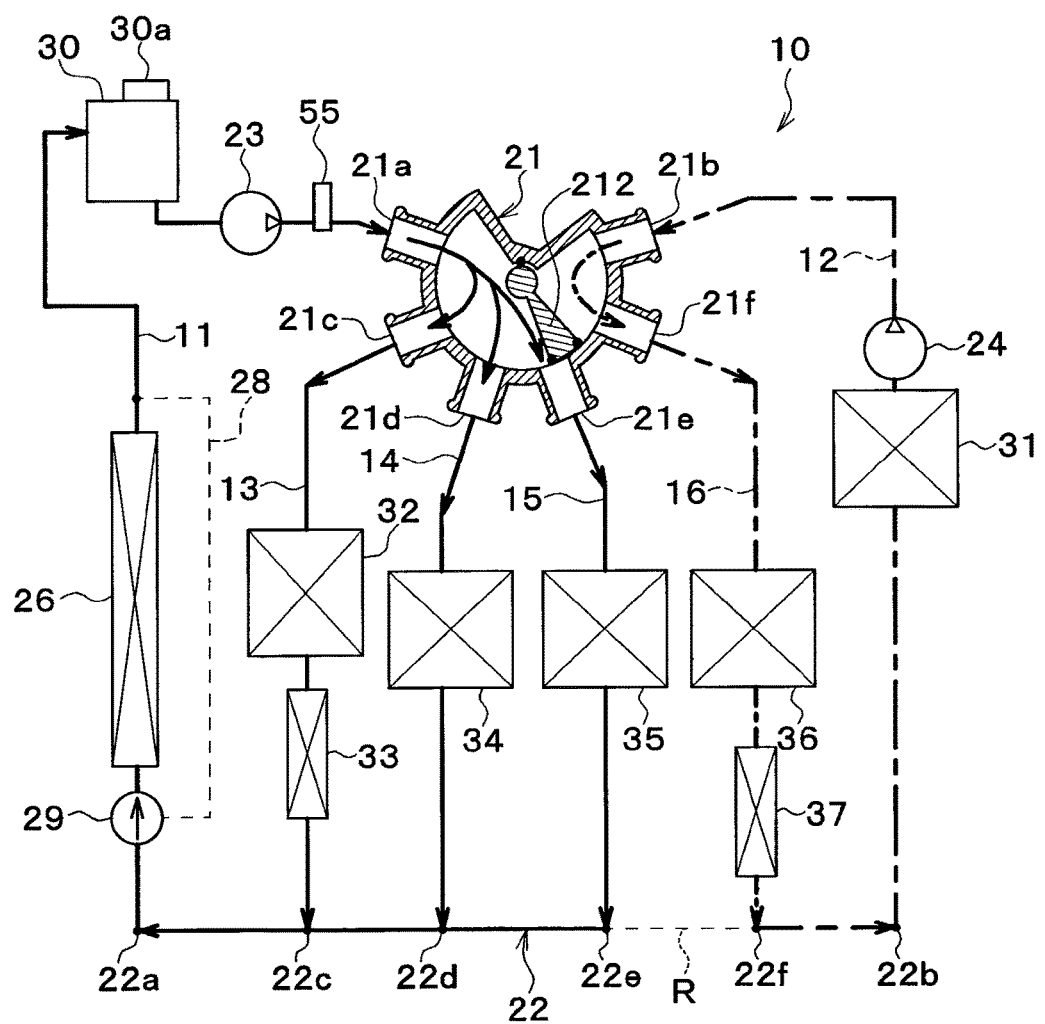
FIG. 16 is an entire configuration diagram showing a fifth operation mode of the thermal management system for a vehicle shown in FIG. 1.

A fifth operation mode shown in FIG. 16 is performed when the amount of heat dissipation from the condenser 32 is large and the amount of heat dissipation from the inverter 35 is small. The case in which the amount of heat dissipation from the condenser 32 is large and the amount of heat dissipation from the inverter 35 is small can be, for example, a case in which a cooling load is high and a traveling load on the vehicle is low.

In the fifth operation mode, the valve body 212 of the switching valve 21 is rotated to a position that permits the third outlet 21*e* to be open in a small opening degree. In this way, the first, third, fourth, and fifth flow paths 11, 13, 14, and 15 communicate with each other to thereby form the first coolant circulation circuit indicated by thick solid lines of FIG. 16, whereas the second and sixth flow paths 12 and 16 communicate with each other to thereby form the second coolant circulation circuit indicated by thick alternate long and short dash lines of FIG. 16.

Since the third outlet 21*e* is open in the small opening degree, in the first coolant circulation circuit, the flow rate of coolant in the fifth flow path 15 is decreased, thereby making the flow rates of coolant in the third and fourth flow paths 13 and 14 increase due to the decrease. Thus, in the inverter 35 from which the amount of heat dissipation is small, the flow rate of the coolant is decreased. On the other hand, in the condenser 32 from which the amount of heat dissipation is large, the flow rate of the coolant is increased.

Thus, the flow rate of the coolant corresponding to the amount of heat dissipation can be ensured without increasing the power from the first pump 23, and thereby it can achieve the power saving.

Figure 17:
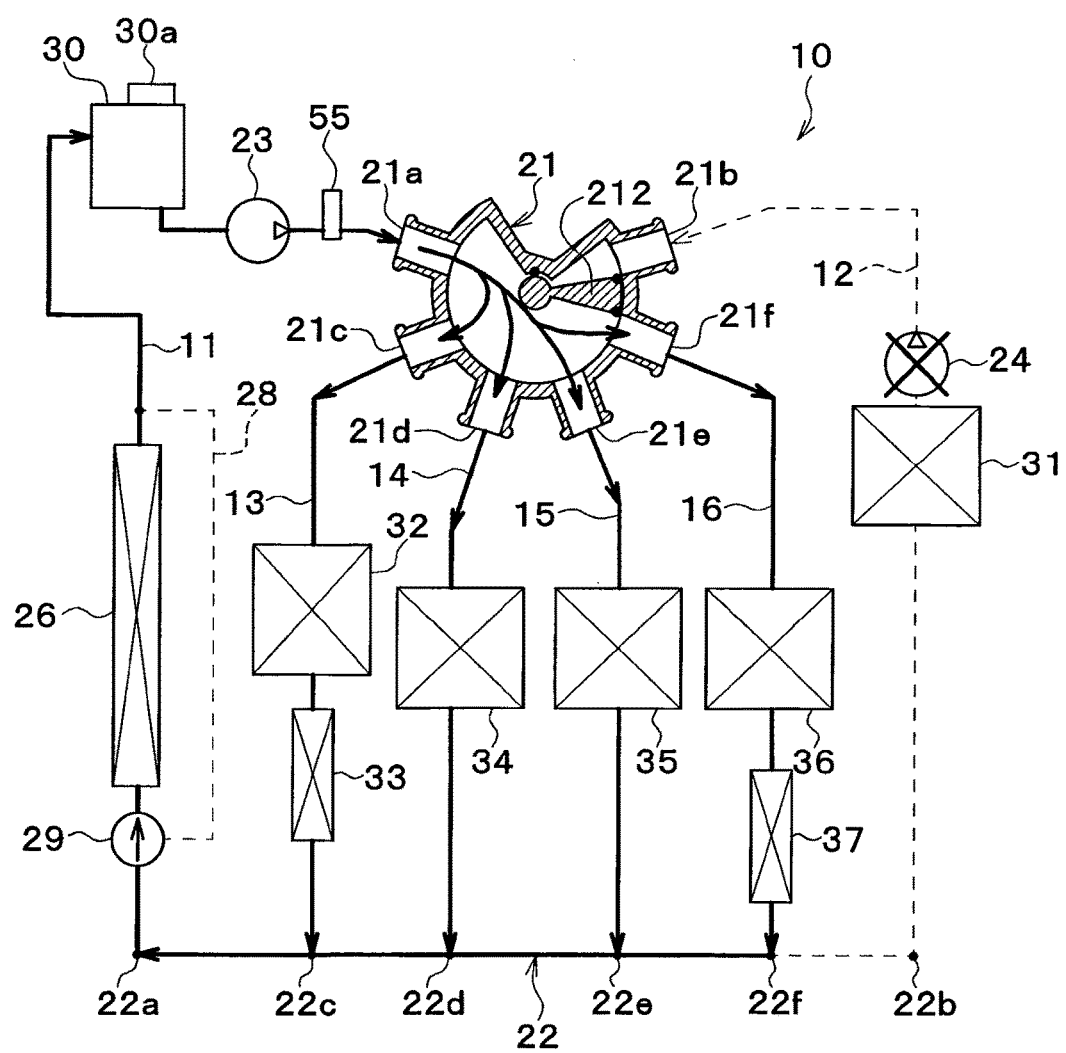
FIG. 17 is an entire configuration diagram showing a sixth operation mode of the thermal management system for a vehicle shown in FIG. 1.

A sixth operation mode shown in FIG. 17 is performed in the event of failure of the second pump 24 (in other words, when the abnormality is assumed or determined to occur in the second pump 24).

The failure of the second pump 24 can be determined by a failure detector included in the second pump 24 itself. Alternatively, when the second pump 24 itself does not include the failure detector, a logic that can detect the failure of the pump is included in the controller 50 or the like, thereby determining the failure of the second pump 24.

In the sixth operation mode, the valve body 212 of the switching valve 21 is rotated to the same position as that in the above-mentioned first operation mode. Thus, since all temperature adjustment target devices 32 to 36 are connected to the first coolant circulation circuit, the first pump 23 which is not broken down allows the coolant to circulate through the radiator 26 and all the temperature adjustment target devices 32 to 36.

As a result, the minimum cooling can be continued through all the temperature adjustment target devices 32 to 36, thereby making it possible to the minimum escape traveling, for example, for the vehicle to escape to a safe place, or to be carried to an automobile repair shop or the like.

Figure 18:
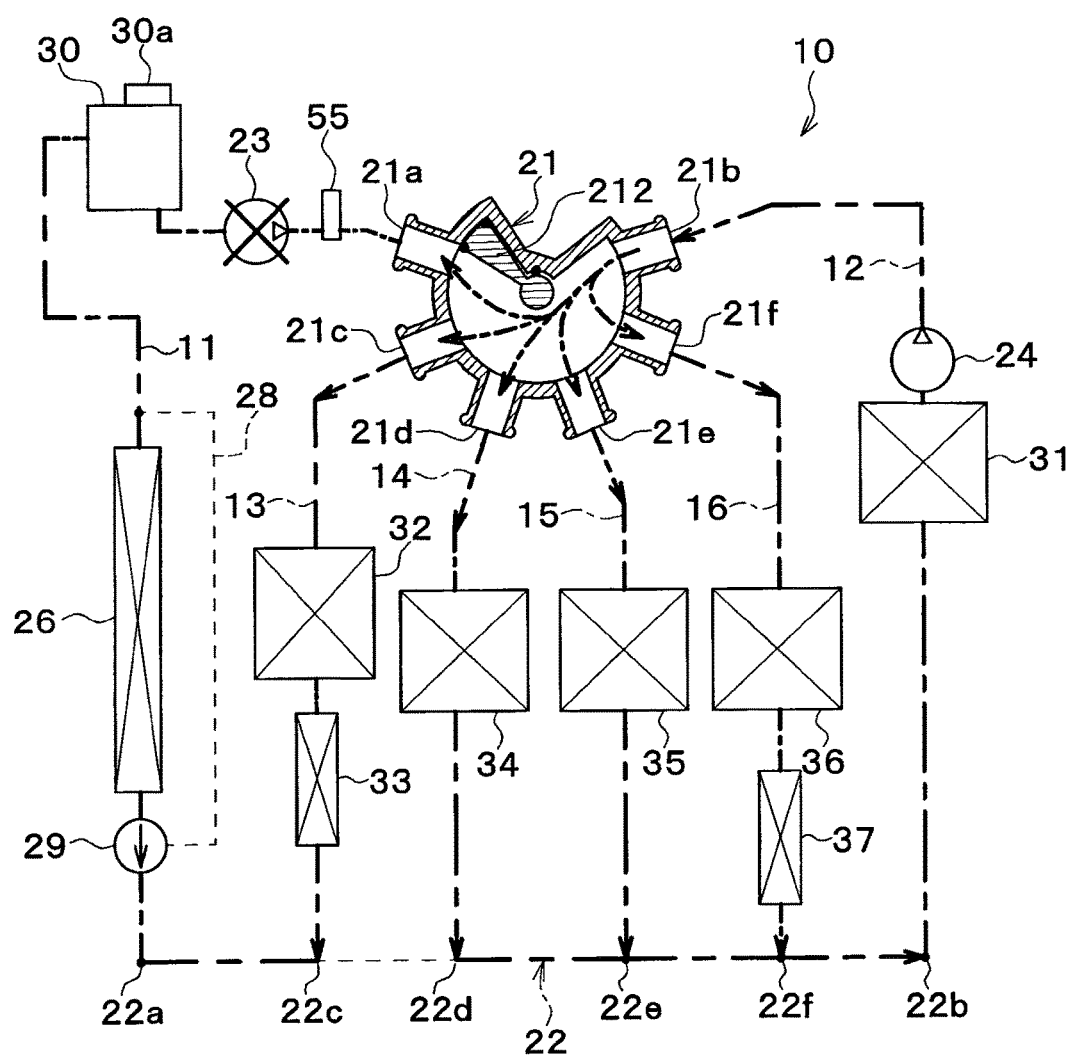
FIG. 18 is an entire configuration diagram showing a seventh operation mode of the thermal management system for a vehicle shown in FIG. 1.

A seventh operation mode shown in FIG. 18 is performed in the event of failure of the first pump 23 (in other words, when an abnormality is assumed or determined to occur in the first pump 23).

The failure of the first pump 23 can be determined by a failure detector included in the first pump 23 itself. Alternatively, when the first pump 23 itself does not include the failure detector, a logic that can detect the failure of the pump is provided in the controller 50 or the like, thereby determining the failure of the first pump 23.

In the seventh operation mode, the valve body 212 of the switching valve 21 is rotated to any position other than a position between the first inlet 21a and the second inlet 21b. Thus, since all flow paths 11 to 16 communicate with each other, the second pump 24 which is not broken down allows the coolant to circulate through the radiator 26 and all the temperature adjustment target devices 32 to 36.

As a result, the minimum cooling can be continued through all the temperature adjustment target devices 32 to 36, thereby making it possible to the minimum escape traveling, for example, for the vehicle to escape to a safe place, or to be carried to an automobile repair shop or the like.

The first embodiment employs the simple structure in which the numerous flow paths 11 to 16 can be connected in parallel between the switching valve 21 and the flow path 22 for collection and distribution to thereby switch the coolants circulating through the numerous flow paths 11 to 16.

The operation of the switching valve 21 is controlled according to various conditions, including the temperature of coolant and the like to switch the coolants circulating through the temperature adjustment target devices 32 to 37. Thus, the temperature adjustment target devices 32 to 37 can be adjusted to the respective appropriate temperatures depending on various conditions.

For example, as shown in FIG. 7, suppose that the first coolant circulation circuit is formed by establishing communication among the first pump 24, radiator 26, and heat exchanger 36 for the battery. Once the coolant temperature in the first coolant circulation circuit exceeds the allowable temperature of the heat exchanger 36 for the battery, as shown in FIG. 8, the second coolant circulation circuit is formed by establishing communication among the second pump 24, the chiller 31, and the heat exchanger 36 for the battery. Thus, the heat exchanger 36 for the battery can be maintained at its allowable temperature or lower, even though the temperature of the coolant flowing through the first coolant circulation circuit is varied depending on various conditions.

Second Embodiment

Figure 19:
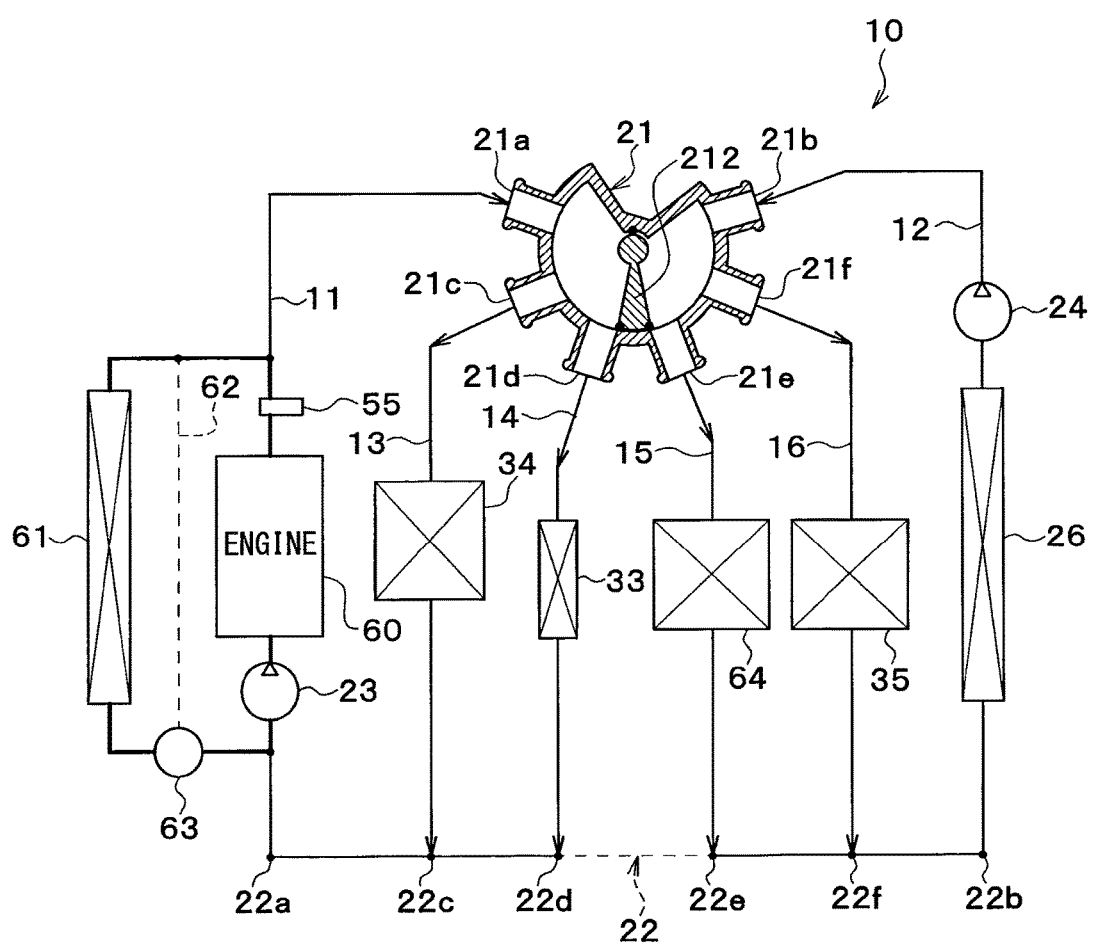
FIG. 19 is an entire configuration diagram of a thermal management system for a vehicle according to a second embodiment.

Referring to FIG. 19, the second embodiment differs from the above-mentioned first embodiment in devices disposed in the flow paths 11 to 16.

In the first flow path 11, the first pump 23, and the engine 60 and radiator 61 for the engine as the temperature adjustment target devices are arranged in parallel to each other. The first pump 23, the engine 60, and the radiator 61 for the engine constitute an engine coolant circuit indicated by thick solid lines of FIG. 19.

In the engine coolant circuit, a radiator bypass flow path 62 and a thermostat 63 are disposed. The radiator bypass flow path 62 is a flow path through which the coolant flows while bypassing the radiator 61 for the engine. The thermostat 63 switches between the flow of the coolant through the radiator 61 for the engine and the flow of the coolant through the radiator bypass flow path 62 in accordance with the temperature of the coolant.

In the first flow path 11, the coolant temperature sensor 55 is disposed on the downstream side directly under the engine 60. In the second flow path 12, the radiator 26 is disposed in series with the second pump 24. In the third flow path 13, the oil heat exchanger 34 is disposed. In the flow path 14, the heater core 33 is disposed. In the fifth flow path 15, an intercooler 64 as the temperature adjustment target device is disposed. In the sixth flow path 16, the inverter 35 is disposed.

A turbocharger (supercharger) is adapted to supercharge an air sucked into the engine 60 (hereinafter referred to as an "intake air"). The intercooler 64 is an intake air cooler (intake air-heat medium heat exchanger) that exchanges heat between a high-temperature supercharged intake air compressed by the turbocharger and the coolant, thereby cooling the supercharged intake air. The supercharged intake air is preferably cooled down to, e.g., about 30° C.

Now, the operation of the above-mentioned structure will be described. During the high load traveling (when a vehicle speed is high or the like), the valve body 212 of the switching valve 21 is rotated to a position between the first inlet 21a and the first outlet 21c.

Thus, the engine 60 can be cooled in the engine coolant circuit, and the waste heat is dissipated by the radiator 26 from the oil heat exchanger 34, intercooler 64, and inverter 35, whereby the oil heat exchanger 34, intercooler 64, and inverter 35 can be cooled.

Because the coolant circulation circuit for cooling the oil heat exchanger 34, intercooler 64, and inverter 35 can be independent from an engine cooling circuit, it can prevent the temperature of the coolant for cooling the oil heat exchanger 34, intercooler 64, and inverter 35 from increasing due to the waste heat of the engine 60 even during the high-load traveling. Thus, even in the high-load traveling, the temperature of oil (engine oil or gear oil) can be kept low, thereby improving a life-span of the oil as well as the combustion efficiency of the engine 60.

At the start-up of the engine 60, the valve body 212 of the switching valve 21 is rotated to a position that completely closes the second outlet 21*d*.

Thus, the coolant recovering the waste heat from the oil heat exchanger 34 flows through the engine 60, and does not flow through the heater core 33, so that the engine 60 can be warmed up at an early stage, while effectively using the waste heat form the oil heat exchanger 34.

When the heat is necessary, in winter or the like, the valve body 212 of the switching valve 21 is rotated to a position between the second outlet 21*d* and the third outlet 21*e*.

Thus, the coolant recovering the waste heat from the engine 60 flows through the heater core 33, so that the heating can be performed using the waste heat from the engine 60.

In the EV traveling mode in which the vehicle travels by obtaining a driving force only from the electric motor for traveling while stopping the engine 10, the valve body 212 of the switching valve 21 is rotated to a position between the fourth outlet 21*f* and the second inlet 21*b*.

As a result, the coolant recovering the waste heat from the inverter 35 flows through the engine 60, so that the engine 60 can be warmed up using the waste heat from the inverter 35 preparing for a next operation of the engine 60.

Third Embodiment

Figure 20:
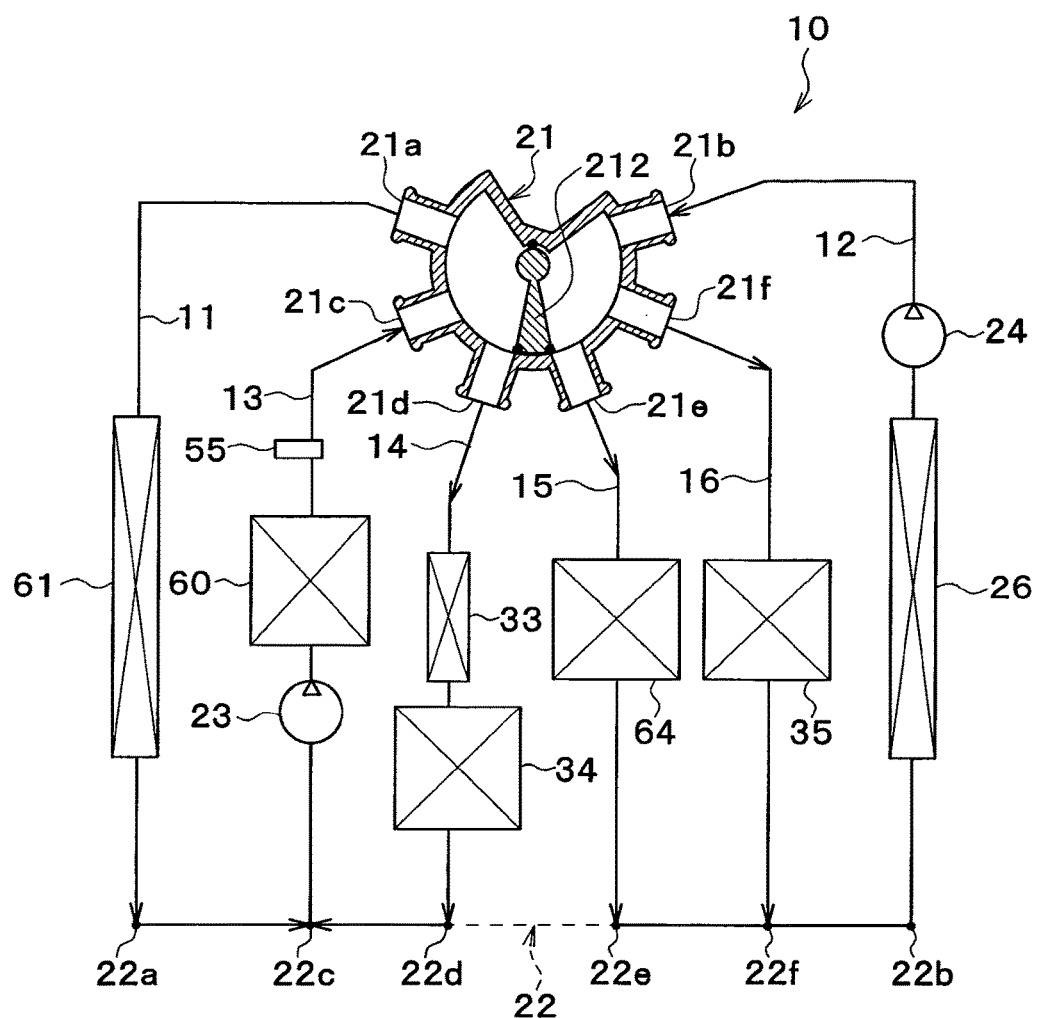
FIG. 20 is an entire configuration diagram of a thermal management system for a vehicle according to a third embodiment.

Referring to FIG. 20, a third embodiment of the invention differs from the above-mentioned second embodiment in devices disposed in the flow paths 11 to 16.

In the first flow path 11, the radiator 61 for the engine is disposed. In the second flow path 12, the second pump 24 and the radiator 26 are disposed in series with each other. In the third flow path 13, the first pump 23 and the engine 60 are disposed in series with each other. In the third flow path 13, the coolant temperature sensor 55 is disposed on the downstream side directly under the engine 60. In the fourth flow path 14, the heater core 33 and the oil heat exchanger 34 are disposed in series with each other. In the fifth flow path 15, the intercooler 64 is disposed. In the sixth path 16, the inverter 35 is disposed.

Now, the operation of the above-mentioned structure will be described. During the EV traveling mode or immediately after the start-up of the engine, the valve body 212 of the switching valve 21 is rotated to a position between the first inlet 21*a* and the first outlet 21*c*. The first pump 23 and the second pump 24 are operated.

In the operation mode, because a generated differential pressure of the first pump 23 and a generated differential pressure of the second pump 24 are offset to each other, the flow of the coolant into the radiator 26 can be interrupted. Thus, the waste heat from the inverter 35 can be efficiently used to warm up the engine 60.

The operation mode is also performed when one of the first pump 23 and second pump 24 is broken down. By operating the pump which is not broken down, the minimum cooling can be continued through all the temperature adjustment target devices 33 to 35, 60, and 64, which makes it possible to the minimum escape traveling, for example, for the vehicle to escape to a safe place, or to be carried to an automobile repair shop or the like.

When the heat is unnecessary in summer or the like, the valve body 212 of the switching valve 21 is rotated to a position between the first outlet 21*c* and the second outlet 21*d*.

In the operation mode, because the coolant discharged from the first pump 23 does not flow into the heater core 33, it can reduce the power for the first pump 23. Further, the coolant recovering the waste heat from the engine 60 does not flow into the oil heat exchanger 34, so that the temperature of the coolant flowing into the oil heat exchanger 34 can be decreased to improve the life span of the oil.

When the heat is necessary, in winter or the like, the valve body 212 of the switching valve 21 is rotated to a position between the second outlet 21*d* and the third outlet 21*e*.

In the operation mode, the coolant recovering the waste heat from the engine 60 flows through the heater core 33, so that the heating can be performed using the waste heat from the engine 60.

When the second pump 24 is broken down, the valve body 212 of the switching valve 21 may be rotated to a position between the fourth outlet 21*f* and the second inlet 21*e*.

In the operation mode, by operating the first pump 23, the minimum cooling can be continued through all the temperature adjustment target devices 33 to 35, 60, and 64, thereby making it possible to the minimum escape traveling, for example, for the vehicle to escape to a safer place, or to be carried to an automobile repair shop or the like.

Fourth Embodiment

Figure 21:
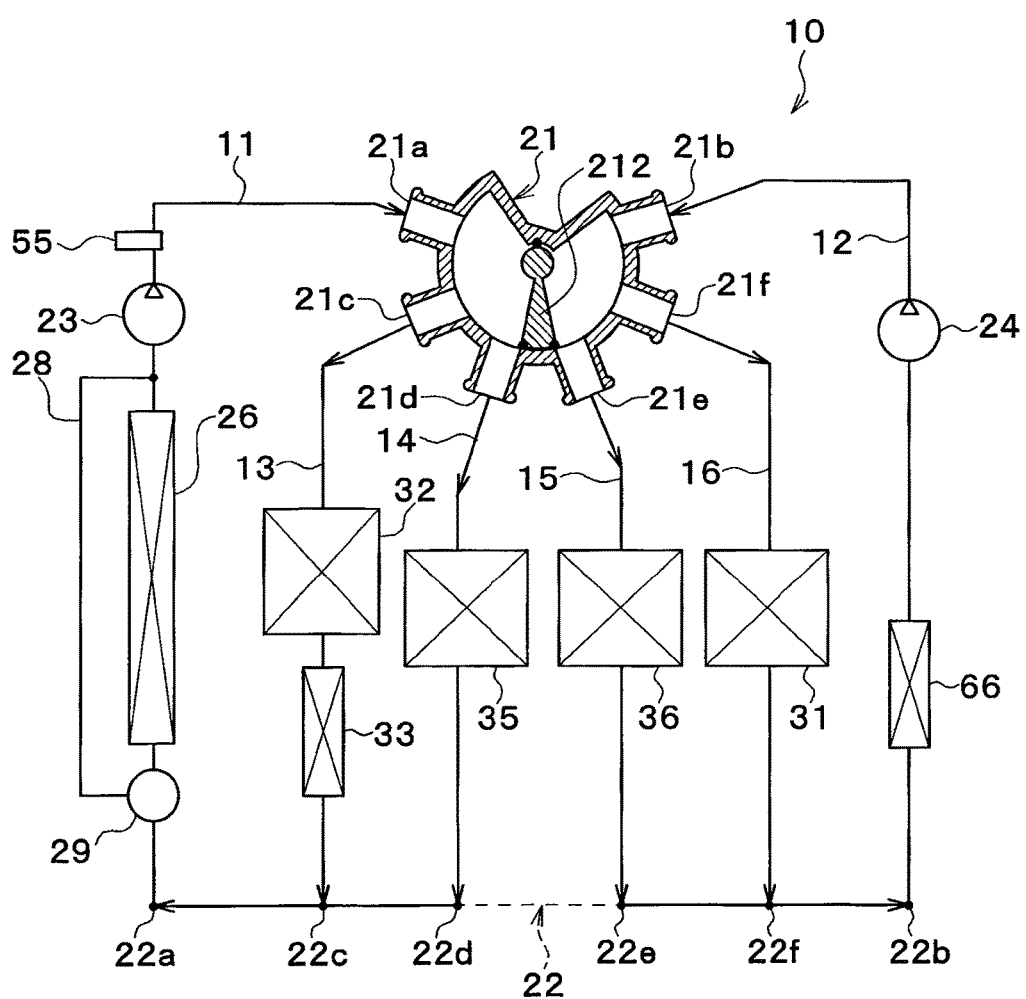
FIG. 21 is an entire configuration diagram of a thermal management system for a vehicle according to a fourth embodiment of the invention.

Referring to FIG. 21, a fourth embodiment of the invention differs from the above-mentioned first embodiment in devices disposed in the first, second, and fourth to sixth flow paths 11, 12, and 14 to 16.

In the first flow path 11, the three-way valve 29, radiator 26, first pump 23, and coolant temperature sensor 55 are arranged in series in that order from the upstream side in the flow direction of the coolant toward the downstream side thereof. Like the first embodiment, the bypass flow path 28 is set. In other words, the reserve tank 30 disposed in the first flow path 11 of the first embodiment may not be disposed. In the second flow path 12, the second pump 24 and a heat-recovering heat exchanger 66 are disposed in series with each other. In the fourth flow path 14, the inverter 35 is disposed. In the fifth flow path 15, the heat exchanger 36 for the battery is disposed. In the sixth flow path 16, the chiller 31 is disposed.

The heat-recovering heat exchanger 66 is a heat exchanger that exchanges heat between the coolant and the inside air to be discharged to the outside of the vehicle for ventilation to thereby recover heat discharged together with the ventilation (hereinafter referred to as an exhaust heat in ventilation), into the coolant. Although not shown, the heat-recovering heat exchanger 66 is disposed in the vicinity of an air vent hole for discharging the inside air to the outside of the vehicle.

Now, the operation of the above-mentioned structure will be described. In heating or cooling, the valve body 212 of the switching valve 21 is rotated to a position between the second outlet 21*d* and the third outlet 21*e*.

With the arrangement, during heating, the exhaust heat in ventilation (hot heat) recovered by the heat-recovering heat exchanger 66 is absorbed in the chiller 31. The heat is pumped up toward the condenser 32 by a heat pump operation of the refrigeration cycle 40, and transferred from the condenser 32 to the coolant. In the heater core 33, the heat is exchanged between the inside air and the coolant, so that the exhaust heat in ventilation can be used to heat the vehicle interior.

During cooling, the exhaust heat in ventilation (cold heat) can be recovered by the heat-recovering heat exchanger 66, thereby decreasing an operating rate of the chiller 31.

Thus, during heating and cooling, the exhaust heat in ventilation can be used to achieve the power saving.

Fifth Embodiment

Figure 22:
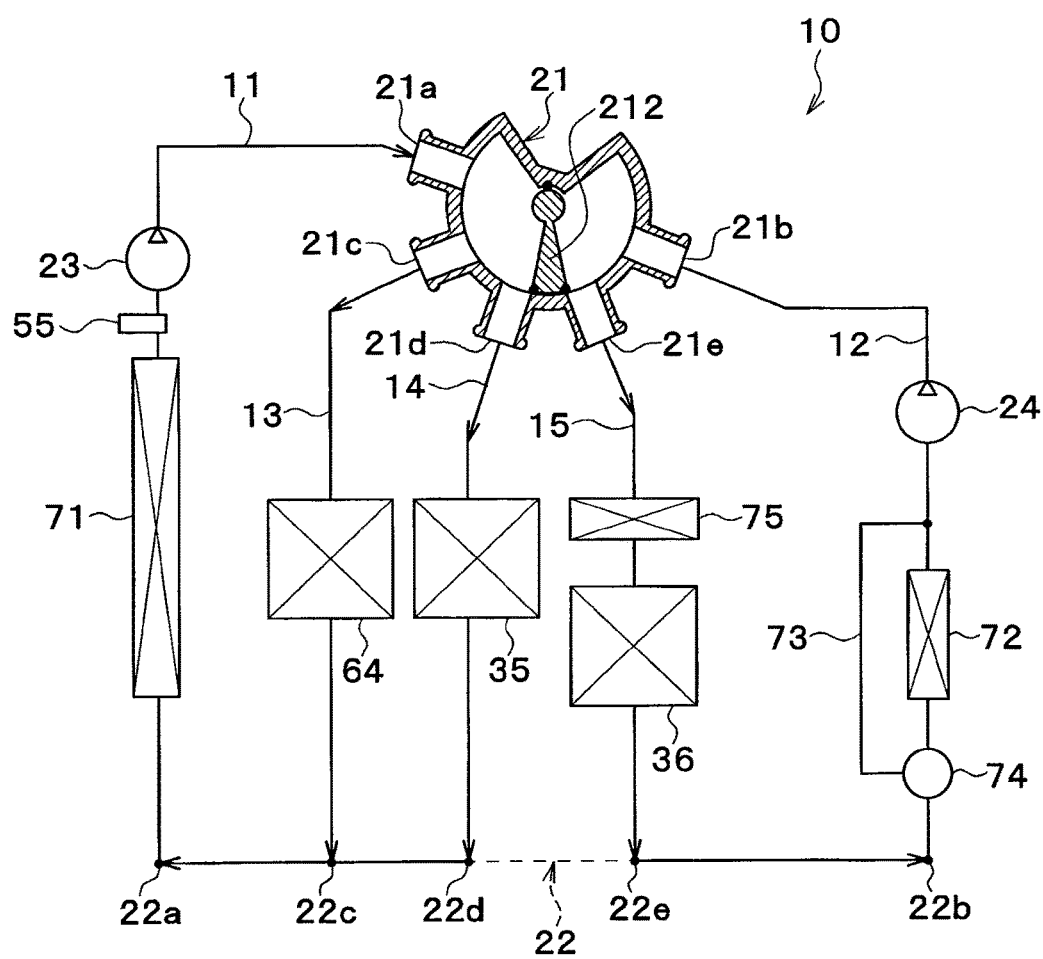
FIG. 22 is an entire configuration diagram of a thermal management system for a vehicle according to a fifth embodiment of the invention.

Referring to FIG. 22, a fifth embodiment differs from the above-mentioned first embodiment in devices disposed in the flow paths 11 to 16.

In the first flow path 11, the first pump 23 and the first radiator 71 are disposed in series with each other. In the first flow path 11, the coolant temperature sensor 55 is disposed on the downstream side directly under a first radiator 71.

In the second flow path 12, the second pump 24 and the second radiator 72 are disposed in series with each other. A part of the second flow path 12 on the side of the flow path 22 for collection and distribution with respect to the second radiator 72 is connected to one end side of a bypass flow path 73 via the three-way valve 74. Another part of the second flow path 12 on the side of the switching valve 24 with respect to the radiator 26 is connected to the other end side of the bypass flow path 73. The three-way valve 74 switches between the flow of the heat medium in the second flow path 12 through the second radiator 72, and the flow of the heat medium through the bypass flow path 73.

In the third flow path 13, the intercooler 64 is disposed. In the fourth path 14, the inverter 35 is disposed. In the fifth flow path 15, the heater 75 for heating the coolant and the heat exchanger 36 for the battery are arranged in series with each other.

The first radiator 71 is a radiator for mainly cooling the intercooler 64. The second radiator 72 is a radiator for mainly cooling the inverter 35 and the heat exchanger 36 for the battery.

The second radiator 72 is disposed on the forward side of the vehicle with respect to the first radiator 71 such that the water temperature at an outlet of the second radiator 72 can be lower than that of the first radiator 71. In other words, the second radiator 72 is disposed in the position of the front surface of the vehicle that is more likely to receive a traveling air than the first radiator 71 such that the water temperature at an outlet of the second radiator 72 can be set lower than that of the first radiator 71. For example, although depending on the shape of the vehicle, generally, a lower part of the front surface of the vehicle is more likely to receive the traveling air. When the second radiator 72 is disposed directly under the first radiator 71 in the vertical direction, the water temperature at the outlet of the second radiator 72 can be lower than that at the outlet of the first radiator 71.

Figure 23:
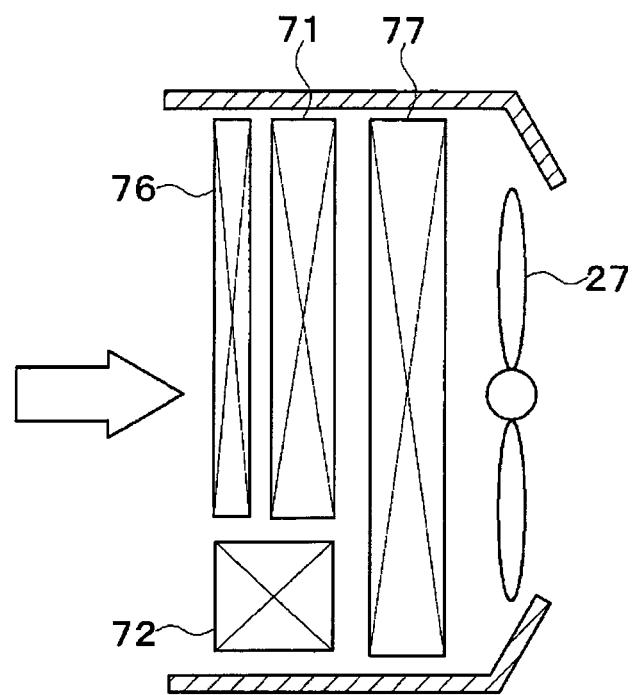
FIG. 23 is an exemplary diagram showing the state of mounting first and second radiators shown in FIG. 22 on the vehicle.

The first radiator 71 and the second radiator 72 are disposed at the forefront of the vehicle. As shown in FIG. 23, the first radiator 71 and the second radiator 72 are arranged in parallel to the flow of the outside air. The first radiator 71 is disposed on the downstream side of the outside air flow of an air-cooled condenser 76, and on the upstream side of the outside air of a radiator 77 for the air-cooled engine. The second radiator 72 is disposed on the upstream side of the outside air flow of the radiator 77 for the air-cooled engine.

Now, the operation of the above-mentioned structure will be described. When the temperature detected by the coolant temperature sensor 55, that is, the temperature of coolant flowing from the first radiator 71 exceeds the allowable temperature (50° C.) of the inverter 35, or is estimated to exceed the allowable temperature (50° C.), the valve body 212 of the switching valve 21 is rotated to a position between the first outlet 21c and the second outlet 21d.

With the arrangement, the temperature of the coolant flowing into the inverter 35 can be equal to or less than the allowable temperature (50° C.), thereby it can protect the inverter 35 from the heat damage.

Note that the case in which the temperature of the coolant flowing from the first radiator 71 exceeds the allowable temperature (50° C.) of the inverter 35 can be a case where the amount of heat dissipation from the intercooler 64 becomes large due to the high-load traveling.

When the temperature detected by the coolant temperature sensor 55, that is, the temperature of coolant flowing from the first radiator 71 is equal to or less than the allowable temperature (e.g., 50° C.) of the inverter 35, or is estimated to be equal to or less than the allowable temperature (e.g., 50° C.), the valve body 212 of the switching valve 21 is rotated to a position between the second outlet 21d and the third outlet 21e.

Because the waste heat from the inverter 35 can be dissipated from the first radiator 71 with high heat dissipation performance, it can reduce the total power for the first pump 23 and second pump 24.

Sixth Embodiment

Figure 24:
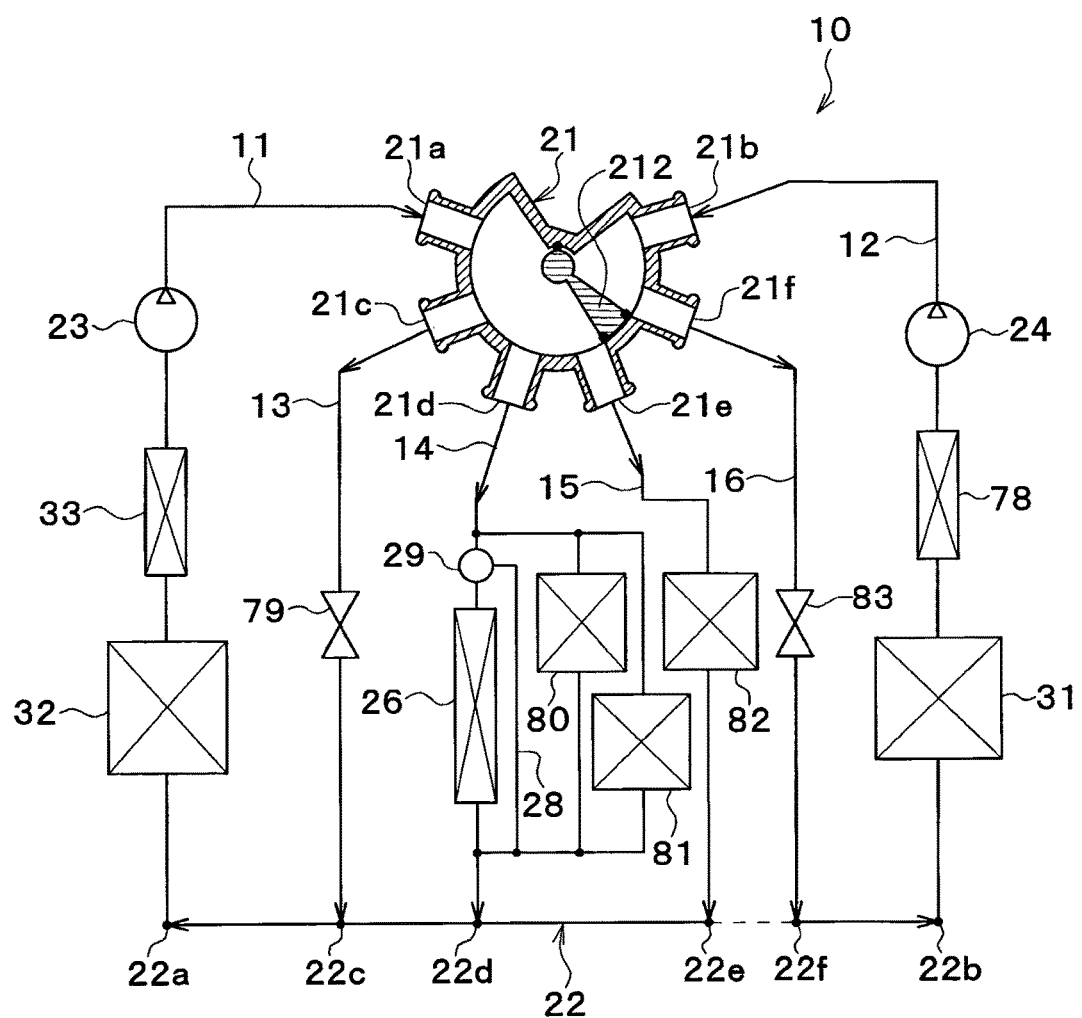
FIG. 24 is an entire configuration diagram of a thermal management system for a vehicle according to a sixth embodiment.

Referring to FIG. 24, a sixth embodiment of the invention differs from the above-mentioned first embodiment in devices disposed in the flow paths 11 to 16.

In the first flow path 11, the first pump 23, the condenser 32, and the heater core 33 are arranged in series with each other.

In the second flow path 12, the second pump 24, the chiller 31, and the cooler core 78 are arranged in series with each other. The heater core 78 is a heat exchanger for air cooling (air-heat medium heat exchanger) that cools the air by exchanging heat between the coolant cooled by the chiller 31 and the air to be blown into the vehicle compartment.

In the third flow path 13, a first shut valve 79 is disposed. The first shut valve 79 is an opening/closing valve (flow path opening/closing portion) for opening and closing the third flow path 13.

In the fourth flow path 14, the radiator 26, first temperature adjustment target device 80, and second temperature adjustment target device 81 are arranged in parallel with each other. A part of the fourth flow path 14 on the switching valve 21 side with respect to the radiator 26 is connected to one end side of the bypass flow path 28 via the three-way valve 29. Another part of the fourth flow path 14 on the side of the flow path 22 for collection and distribution with respect to the radiator 26 is connected to the other end side of the bypass flow path 28.

In the fifth flow path 15, a third temperature adjustment target device 82 is disposed. The allowable temperature of the third temperature adjustment target device 82 is lower than the allowable temperature of each of the first and second temperature adjustment target devices 80 and 81.

In the sixth flow path 16, a second shutter valve 83 is disposed. The second shut valve 83 is an opening/closing valve (flow path opening/closing portion) for opening and closing the sixth flow path 16.

Now, the operation of the above-mentioned structure will be described. In heating under a low outside air temperature, the valve body 212 of the switching valve 21 is rotated to the position between the first outlet 21c and the second outlet 21d, whereby the first shut valve 79 is open and the second shut valve 83 is closed.

With the arrangement, the waste heat from the first to third temperature adjustment target devices 80 to 82, and the heat of the outside air absorbing heat by the radiator 26 are recovered by the chiller 31. The heat is pumped up toward the condenser 32 by a heat pump operation of the refrigeration cycle 40, and transferred from the condenser 32 to the coolant. In the heater core 33, the heat is exchanged between the inside air and the coolant, thereby heating the vehicle interior.

When the temperature of the coolant in the first flow path 11 is higher than the allowable temperature of the third temperature adjustment target device 82, the valve body 212 of the switching valve 21 is rotated to the position between the second outlet 21d and the third outlet 21e, whereby the first shut valve 79 is closed and the second shut valve 83 is also closed.

Thus, the coolant cooled by the chiller 31 can cool the third temperature adjustment target device 82. The exhaust heat from the condenser 32, first temperature adjustment target device 80, and second temperature adjustment target device 81 is dissipated from the radiator 26, thereby it can cool the condenser 32, first temperature adjustment target device 80, and second temperature adjustment target device 81.

When the cooling is necessary in summer or the like, the valve body 212 of the switching valve 21 is rotated to the position between the fourth outlet 21f and the second inlet 21b, the first shut valve 79 is closed, and the second shut valve 83 is open. Thus, the coolant cooled by the chiller 31 can cool the cooler core 78, thereby cooling the vehicle interior.

Seventh Embodiment

Figure 25:
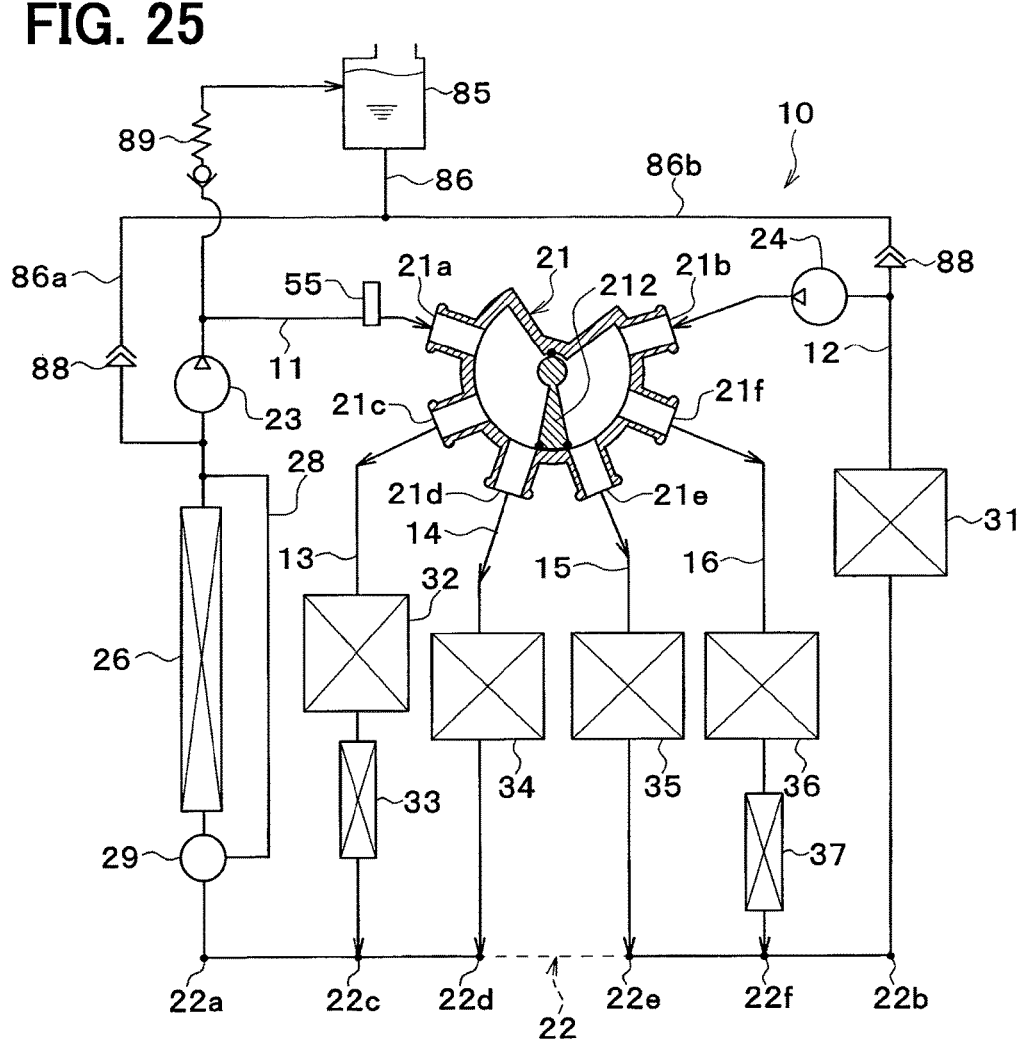
FIG. 25 is an entire configuration diagram of a thermal management system for a vehicle according to a seventh embodiment.

In a seventh embodiment of the invention, as shown in FIG. 25, a reserve tank 85 is added to the structure of the above first embodiment.

The reserve tank 85 is connected to the first flow path 11 and the second flow path 12 via a first connection flow path 86. The first connection flow path 86 is branched into two paths on the side opposite to the reserve tank 85, which are respectively connected to a part between the radiator 26 and the first pump 23 in the first flow path 11, as well as a part between the chiller 31 and the second pump 24 in the second flow path 12.

The reserve tank 85 is connected to the part between the first pump 23 and the switching valve 21 in the first flow path 11 via the second connection flow path 87.

The reserve tank 85 is an air release container (heat medium storage portion) for storing the coolant therein. Because excessive coolant is stored in the reserve tank 85, it can suppress the decrease in liquid amount of the coolant circulating through the respective flow paths. The reserve tank 85 has a function of separating the air bubbles contained in the coolant, into gas and liquid components.

Two parts 86a and 86b branched from the first connection flow path 86 are respectively provided with negative pressure valves 88. The second connection flow path 87 is provided with a pressurizing valve 89.

The negative pressure valve 88 is closed when the internal pressure of the flow path is equal to or higher than atmospheric pressure, and is open when the internal pressure of the flow path is lower than the atmospheric pressure. Thus, when the internal pressure of the first coolant circulation circuit is less than the atmospheric pressure, the coolant in the reserve tank 85 is supplied to the first coolant circulation circuit. When the internal pressure of the second coolant circulation circuit is less than the atmospheric pressure, the coolant in the reserve tank 85 is supplied to the second coolant circulation circuit.

The pressurizing valve 89 is closed when the internal pressure of the flow path is lower than a preset pressure (108 kPa in the example) which is higher than the atmospheric pressure, and is open when the internal pressure of the flow path is equal to or higher than the preset pressure. Thus, when the internal pressure of the first coolant circulation circuit is equal to or higher than the preset pressure, the coolant in the first coolant circulation circuit is discharged to the reserve tank 85.

In the embodiment, the reserve tank 85 is connected to the first flow path 11 via the negative pressure valve 88. When the pressure of the first coolant circulation circuit is lower than a first predetermined pressure (atmospheric pressure in this example) due to the contraction of the volume of the coolant together with a decrease in temperature of the coolant in the first coolant circulation, the coolant can be supplied from the reserve tank 85 into the first coolant circulation circuit.

The reserve tank 85 is connected to the first flow path 11 via the pressurizing valve 89. When the pressure of the first coolant circulation circuit is higher than or equal to a second predetermined pressure (e.g., a preset pressure higher than the atmospheric pressure in this example) due to the expansion of the volume of the coolant together with an increase in temperature of the coolant in the first coolant circulation, the coolant in the first coolant circulation circuit can be discharged into the reserve tank 85. As mentioned above, the pressure of the first coolant circulation circuit can be maintained within an appropriate range.

The reserve tank 85 is connected to the second flow path 12 for forming the second coolant circulation circuit via the negative pressure valve 88. When the pressure of the second coolant circulation circuit is lower than the first predetermined pressure (the atmospheric pressure in this example), the coolant can be supplied from the reserve tank 85 into the second coolant circulation circuit.

The reserve tank 85 is connected to the downstream side of the coolant flow with respect to the radiator 26, and the suction side of the first pump 23 in the first coolant circulation circuit, so that the pressure on the suction side of the first pump 23 becomes approximately the atmospheric pressure. The arrangement can prevent an increase in pressure loss due to the occurrence of cavitation and the breakdown of a coolant hose that might be caused as the pressure on the suction side of the first pump 23 becomes a negative pressure.

The reserve tank 85 is connected to the downstream side of the coolant flow with respect to the chiller 31, and to the suction side of the second pump 24 in the second coolant circulation circuit, so that the pressure on the suction side of the second pump 24 becomes approximately the atmospheric pressure. The arrangement can prevent an increase in pressure loss due to the occurrence of cavitation and the breakdown of the coolant hose that might be caused as the pressure on the suction side of the second pump 24 becomes a negative pressure.

The second coolant circulation circuit communicates with the first coolant circulation circuit via the flow path 22 for collection and distribution. Thus, the pressure of the first coolant circulation circuit is also increased when the pressure of the second coolant circulation circuit is increased due to the increase in volume of the coolant together with the increase in temperature of the coolant of the second coolant circulation circuit. As a result, when the pressure of the first coolant circulation circuit is equal to or higher than the second predetermined pressure (preset pressure higher than the atmospheric pressure in this example), the coolant in the first coolant circulation circuit is discharged to the reserve tank 85. As mentioned above, the pressure of the second coolant circulation circuit can be maintained within an appropriate range.

The flow path 22 for collection and distribution is formed on the downstream side of the coolant flow (on the pump suction side) with respect to the switching valve 21, which can prevent the formation of a part of the second coolant circulation circuit from becoming a negative pressure in an operating state where a pump head of the first pump 23 is lower than that of the second pump 24. The reason for the above description will be given below.

For better understanding, in the description below, an operating state is assumed in which the first pump 23 is stopped and the second pump 24 is operating with a predetermined range of lift.

When the first pump 23 is stopped, the air-release reserve tank 85 is connected to the first coolant circulation circuit, whereby any part of the first coolant circulation circuit becomes substantially the atmospheric pressure. At this time, because the first pump 23 and the second pump 24 differ from each other in a range of lift, it generates a difference in pressure between the first and second coolant circulation circuits. Thus, the internal coolant will leak from the switching valve 21.

When the internal coolant leaks from the switching valve 21, the coolant is transferred between the first and second coolant circulation circuits in the switching valve 21 so as to equalize the pressures between these circulation circuits.

Provided that the first and second coolant circulation circuits do not communicate with each other at the flow path 22 for collection and distribution, the switching valve 21 which transfers the most amount of coolant is adapted to equalize the pressures between the first and second coolant circulation circuits. As mentioned above, since the air-release reserve tank 85 is connected to the first coolant circulation circuit, when the first pump 23 is stopped, any part of the first coolant circulation circuit becomes substantially the atmospheric pressure. Regarding the pressure of the second coolant circulation circuit, the pressure of the switching valve 21 becomes substantially the atmospheric pressure, and thus the pressure on the discharge side of the second pump 24 also becomes substantially the atmospheric pressure.

In this case, the pressure on the suction side of the second pump 24 becomes a pressure obtained by subtracting a pressure corresponding to the range of lift of the pump from the pressure on the discharge side of the second pump 24. As a result, the pressure on the suction side of the second pump 24 becomes a negative pressure.

In this way, in the case where the first and second coolant circulation circuits do not communicate with each other in the flow path 22 for collection and distribution, when there is a difference in range of lift between the first pump 23 and the second pump 24, the pressure on the suction side of the second pump 24 becomes a negative pressure, thereby causing the cavitation.

From the above point, in the embodiment, the first coolant circulation circuit and the second coolant circulation circuit communicate with each other in the flow path 22 for collection and distribution formed on the downstream side of the coolant flow (on the suction side of the pump) with respect to switching valve 21. As a result, the amount of transfer of the coolant between the first and second coolant circulation circuits becomes the most in the flow path 22 for collection and distribution.

Thus, the pressures are equalized between the first and second coolant circulation circuits in the flow path 22 for collection and distribution where the amount of transfer of the coolant becomes most. As a result, regarding the pressure of the second coolant circulation circuit, the pressure of the second switching valve 22 becomes substantially the atmospheric pressure, and thus the pressure on the suction side of the second pump 24 also becomes substantially the atmospheric pressure. The arrangement can avoid the pressure on the suction side of the second pump 24 from being a negative pressure.

Eighth Embodiment

Figure 26:
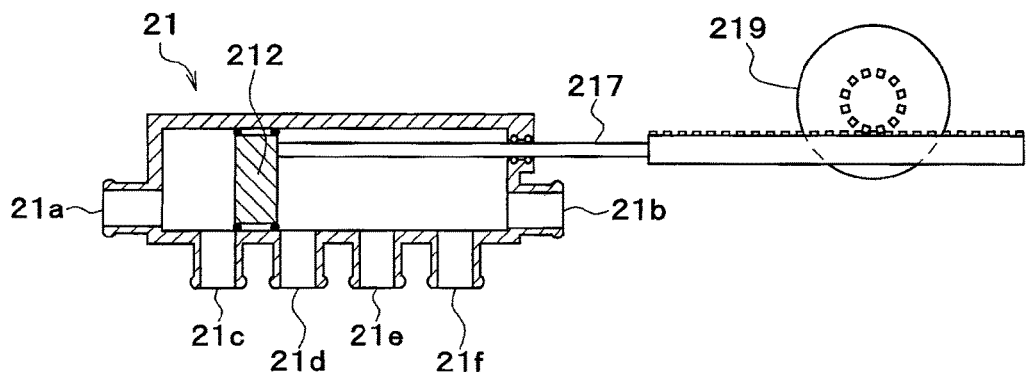
FIG. 26 is a cross-sectional view showing a switching valve according to an eighth embodiment.

While in the above first embodiment, the valve body 212 of the switching valve 21 is rotatably driven, in an eighth embodiment, as shown in FIG. 26, the valve body 212 of the switching valve 21 is linearly driven.

A shaft 217 is fixed to the valve body 212. The shaft 217 protrudes toward the outside of the housing 211, and is coupled to a rack 218 and a pinion 219. The pinion 219 is rotatably driven by the electric actuator.

The rotary driving force of the electric actuator is converted into a linear driving force by the rack 218 and the pinion 219, and then transferred to the shaft 217, causing the valve body 212 to be linearly driven.

The housing 211 are provided with the first inlet 21*a*, first outlet 21*c*, second outlet 21*d*, third outlet 21*e*, fourth outlet 21*f*, and second inlet 21*b* that are arranged in that order side by side along the driving direction of the valve body 212. Thus, the communication states between the first and second inlets 21*a* and 21*b* and the first to fourth outlets 21*c* to 21*f* are switched depending on the operating position of the valve body 212.

For example, when the valve body 212 is rotated to the position shown in FIG. 3, the first inlet 21*a* communicates with the first and second outlets 21*c* and 21*d*, whereas the second inlet 21*b* communicates with the third and fourth outlets 21*e* and 21*f*.

Other Embodiments

The present disclosure is not limited to the above-mentioned embodiments, and various modifications and changes can be made to the disclosed embodiments as follows.

(1) Various devices can be used as the temperature adjustment target devices. For example, the temperature adjustment target device may be a heat exchanger incorporated in a seat where a passenger sits and adapted to cool and heat the seat by coolant. The number of the temperature adjustment target devices may be any number as long as the number is a plural number (two or more).

(2) In each of the above-mentioned embodiments, the coolant may intermittently circulate through the temperature adjustment target device to thereby control the heat exchanging capacity for the temperature adjustment target device.

(3) In the embodiments described above, the chiller 31 for cooling the coolant by the low-pressure refrigerant of the refrigeration cycle 40 is used as the cooler for cooling the coolant. However, a Pettier element may be used as the cooler.

(4) In each of the above-mentioned embodiments, the coolant is used as the heat medium. Alternatively, various kinds of media, such as oil, may be used as the heat medium.

(5) Nano-fluid may be used as the coolant (heat medium). The nano-fluid is a fluid into which nanoparticles with a particle diameter of the order of nanometer are mixed. Mixing of the nanoparticles into the coolant can have the following function effects, in addition to the same function effect of decreasing a freezing point as that in the use of a coolant containing ethylene glycol (so-called antifreeze solution).

That is, the above-mentioned function effects can include improving a thermal conductivity in a specific temperature range, increasing a heat capacity of the coolant, preventing corrosion of a metal pipe or degradation of a rubber pipe, and enhancing a fluidity of the coolant at an ultralow temperature.

Such effects vary depending on the composition, shape, and compounding ratio of the nanoparticle, an additive, and the like.

The arrangement can improve the thermal conductivity, and thus can obtain the same cooling efficiency, even though the above coolant containing the nanoparticles is used in a small amount, as compared to the coolant using ethylene glycol.

A thermal capacity of the coolant can be increased to increase the amount of the cold heat stored in the coolant itself (stored cold heat due to sensible heat).

An aspect ratio of the nanoparticle is preferably equal to or more than 50. This is because sufficient heat conductivity can be obtained. The term "aspect ratio" as used herein means a shape index indicative of a ratio between the longitudinal and lateral dimensions of the nanoparticle.

Nanoparticles for use can include any one of Au, Ag, Cu, and C. Specifically, as atoms of the nanoparticles, an Au nanoparticle, a Ag nanowire, a CNT (carbon nanotube), a graphene, a graphite core shell type nano particle (grain body having a structure surrounding the above-mentioned atom, such as a carbon nanotube), an Au nanoparticle-containing CNT, and the like.

(6) The refrigeration cycle 40 of each of the above embodiments employs a fluorocarbon refrigerant as the refrigerant. However, the kind of the refrigerant is not limited thereto. Specifically, a natural refrigerant, such as carbon dioxide, a hydrocarbon-based refrigerant, and the like may also be used as the refrigerant.

The refrigeration cycle 40 of each of the above embodiments forms a subcritical refrigeration cycle whose high-pressure side refrigerant pressure does not exceed a critical pressure of the refrigerant. Alternatively, the refrigeration cycle may form a supercritical refrigeration cycle whose high-pressure side refrigerant pressure exceeds the critical pressure of the refrigerant.

(7) In each of the above-mentioned embodiments, the vehicle cooling system of the present disclosure is applied to the hybrid vehicle by way of example. Alternatively, the present disclosure may be applied to an electric car which obtains a driving force for traveling from an electric motor for traveling without including an engine, a fuel cell vehicle which uses a fuel cell as a traveling energy generator, or the like.

(8) Although in each of the above-mentioned embodiments, a door-type valve body is used as the valve body 212 of the switching valve 21 by way of example, a rotary valve or butterfly type valve body may be used as the valve body of the switching valve 21.

(9) In each of the above-mentioned embodiments, the switching valve 21 switches the communication states between the first and second inlets 21a and 21b and the first to fourth outlets 21c to 21f by movement of the valve body 212. The switching valve 21 has numerous opening/closing valves for independently opening and closing the first and second inlets 21a and 21b, and the first to fourth outlets 21c to 21f. The switching valve 21 may switch the communication states between the first and second inlets 21a and 21b and the first to fourth outlets 21c to 21f by opening and closing the numerous opening/closing valves.

(10) In the above first embodiment, the operation mode is switched based on the coolant temperature detected by the coolant temperature sensor 55. Alternatively, the operation mode may be switched based on the estimated temperature or predicted temperature of the coolant temperature in the first coolant circulation circuit.

What is claimed is:

1. A thermal management system for a vehicle, comprising:
    a first pump and a second pump sucking and discharging a heat medium;
    a first heat exchanger and a second heat exchanger exchanging heat with the heat medium, to change a temperature of the heat medium;
    at least one of temperature adjustment target devices, each of which has a temperature adjusted by the heat medium;
    numerous flow paths allowing the heat medium to flow therethrough, the numerous flow paths including a first-pump arrangement flow path in which the first pump is disposed, a second-pump arrangement flow path in which the second pump is disposed, and a temperature-adjustment target-device arrangement flow path in which one or more of the temperature adjustment target devices is disposed;
    a switching portion connected to one ends of the numerous flow paths, and adapted to allow the numerous flow paths to selectively communicate with each other; and
    a communication flow path connected to the other ends of the numerous flow paths in parallel with each other, and adapted to allow the numerous flow paths to communicate with each other, wherein
    the first-pump arrangement flow path, the temperature-adjustment target-device arrangement flow path, and the second-pump arrangement flow path are connected to the communication flow path in this order, from one end side of the communication flow path toward the other end side of the communication flow path,
    the first heat exchanger is disposed in one flow path among the numerous flow paths, that is connected to the communication flow path at a position on a side of the first-pump arrangement flow path, rather than the second-pump arrangement flow path in which the second heat exchanger is disposed, and
    the switching portion is operated to have communication between plural flow paths among the numerous flow paths, starting from the one flow path connected to the communication flow path at a position closest to the one end side of the communication flow path, up to a flow path connected to the communication flow path at an n-th position counted from the one end side of the communication flow path.

2. The thermal management system for a vehicle according to claim 1, wherein the switching portion is operated such that the first-pump arrangement flow path is included in the plural flow paths, and that the second-pump arrangement flow path is included in a flow path other than the plural flow paths, among the numerous flow paths.

3. The thermal management system for a vehicle according to claim 1, further comprising:
a plurality of the temperature-adjustment target-device arrangement flow paths, wherein
the temperature adjustment target devices are respectively arranged in the temperature-adjustment target-device arrangement flow paths, and
an allowable temperature of the temperature adjustment target device disposed in the temperature-adjustment target-device arrangement flow path positioned on the one end side of the communication passage, among the temperature-adjustment target-device arrangement flow paths, is equal to or higher than an allowable temperature of the temperature adjustment target device disposed in the temperature-adjustment target-device arrangement flow path positioned on the other end side of the communication passage, among the temperature-adjustment target-device arrangement flow paths.

4. The thermal management system for a vehicle according to claim 1, wherein,
in a case where the first pump, the first heat exchanger, and the at least one of the temperature adjustment target devices communicate each other to allow the plural flow paths to form a first heat medium circuit, while two or more flow paths among the numerous flow paths, which are flow paths other than the plural flow paths, and which include the second-pump arrangement flow path, communicate each other to form a second heat medium circuit,
the switching portion is operated such that the second pump, the second heat exchanger, and the temperature adjustment target device communicate each other to form the second heat medium circuit, (i) when a temperature of the heat medium in the first heat medium circuit is detected or estimated to exceed a predetermined temperature, or (ii) when a temperature of the heat medium in the first heat medium circuit is predicted to exceed a predetermined temperature.

5. The thermal management system for a vehicle according to claim 4, wherein the at least one of the temperature adjustment target devices, forming the first heat medium circuit, is included in the second heat medium circuit.

6. The thermal management system for a vehicle according to claim 4, wherein
the at least one of the temperature adjustment target devices includes an electric device that generates heat when being energized, and
the first heat exchanger is an air-heat medium heat exchanger that exchanges heat between air and the heat medium.

7. The thermal management system for a vehicle according to claim 4, wherein
the at least one of the temperature adjustment target devices includes a battery cooler that cools a battery with the heat medium,
the first heat exchanger is an air-heat medium heat exchanger exchanging heat between air and the heat medium, and
the second heat exchanger is a chiller exchanging heat between a low-pressure refrigerant in a refrigeration cycle and the heat medium.

8. The thermal management system for a vehicle according to claim 1, wherein in a case where (i) the at least one of the temperature adjustment target devices includes a condenser exchanging heat between a high-pressure refrigerant in a refrigeration cycle and the heat medium, an inverter converting a direct-current power into an alternate-current power, and a battery cooler cooling a battery with the heat medium,
(ii) the first heat exchanger is an air-heat medium heat exchanger exchanging heat between air and the heat medium,
(iii) the air-heat medium heat exchanger is disposed in the first-pump arrangement flow path,
(iv) the second heat exchanger is a chiller exchanging heat between a low-pressure refrigerant in the refrigeration cycle and the heat medium,
(v) the chiller is disposed in the second-pump arrangement flow path,
(vi) the flow path among the numerous flow paths, in which the condenser is disposed, is a condenser arrangement flow path,
(vii) the flow path among the numerous flow paths, in which the inverter is disposed, is an inverter arrangement flow path, and
(viii) the flow path among the numerous flow paths, in which the battery cooler is disposed, is a battery cooler arrangement flow path,
the first-pump arrangement flow path, the condenser arrangement flow path, the inverter arrangement flow path, the battery cooler arrangement flow path, and the second-pump arrangement flow path are connected in this order to the communication flow path from the one end side to the other end side of the communication flow path.

9. The thermal management system for a vehicle according to claim 8, wherein
the temperature-adjustment target-device arrangement flow path includes the condenser arrangement flow path, the inverter arrangement flow path, and the battery cooler arrangement flow path, and
the condenser arrangement flow path, the inverter arrangement flow path, and the battery cooler arrangement flow path are connected to the communication flow path in this order from one end side to the other end side of the communication flow path.

10. The thermal management system for a vehicle according to claim 1, wherein
the first heat exchanger is an air-heat medium heat exchanger exchanging heat between air and the heat medium,
when an abnormality is assumed or determined to occur in one of the first pump and the second pump, the switching portion is operated such that the at least one of the temperature adjustment target devices communicates with the other one of the first pump and the second pump, as well as the air-heat medium heat exchanger.

11. The thermal management system for a vehicle according to claim 1, further comprising:
a bypass flow path connected to a flow path among the numerous flow paths, in which the first heat exchanger is disposed, and adapted to allow the heat medium to bypass the first heat exchanger; and
a valve body switching between a flow of the heat medium through the first heat exchanger and a flow of the heat medium through the bypass flow path, wherein
at least one of the temperature adjustment target devices includes a condenser exchanging heat between a high-pressure refrigerant in the refrigeration cycle and the heat medium, a heater core exchanging heat between the heat medium and air to be blown into a vehicle compartment, and a cooling target device cooled by the heat medium, the first heat exchanger is an air-heat medium heat exchanger exchanging heat between air and the heat medium, the second heat exchanger is a chiller exchanging heat between a low-pressure refrigerant in the refrigeration cycle and the heat medium, and the switching portion is operated to allow the chiller and the cooling target device to communicate with each other, and to allow the condenser, the heater core, and the air-heat medium heat exchanger to communicate with each other, while the valve body is operated to allow the heat medium to flow through the bypass flow path.

12. The thermal management system for a vehicle according to claim 1, wherein the at least one of the temperature adjustment target devices include a chiller exchanging heat between a low-pressure refrigerant in the refrigeration cycle and the heat medium, a heat exchanger for a cold accumulator that cools or heats a cold accumulator capable of storing cold heat therein, and a refrigerant supercooling heat exchanger that supercools a refrigerant cooled by a condenser with the heat medium, the condenser being adapted to exchange heat between a high-pressure refrigerant in the refrigeration cycle and the heat medium, and the switching portion is operated to establish communication between the heat exchanger for the cold accumulator and the refrigerant supercooling heat exchanger when cold heat is stored in the cold accumulator.

13. The thermal management system for a vehicle according to claim 1, wherein the one or more temperature adjustment target devices include an internal combustion engine, an oil-heat medium heat exchanger exchanging heat between oil and the heat medium, a heater core heating air to be blown into a vehicle compartment by exchanging heat between the air and the heat medium, an intercooler exchanging heat between the heat medium and a supercharged intake air drawn into the internal combustion engine, and an inverter converting a direct-current power into an alternate-current power, and each of the first heat exchanger and the second heat exchanger is a radiator that exchanges heat between the heat medium and outside air.

14. The thermal management system for a vehicle according to claim 1, wherein the at least one of the temperature adjustment target devices include a condenser exchanging heat between a high-pressure refrigerant in the refrigeration cycle and the heat medium, a heater core heating air to be blown into a vehicle compartment by exchanging heat between the air and the heat medium, an inverter converting a direct-current power into an alternate-current power, a battery cooler cooling a battery with the heat medium, and an exhaust heat-recovering heat exchanger in ventilation that exchanges heat between the heat medium and a vehicle interior air to be discharged toward an outside of the vehicle for ventilation, the first heat exchanger is a radiator exchanging heat between the heat medium and outside air, and the second heat exchanger is a chiller exchanging heat between a low-pressure refrigerant in the refrigeration cycle and the heat medium.

15. The thermal management system for a vehicle according to claim 1, wherein the at least one of the temperature adjustment target devices includes an intercooler exchanging heat between a supercharged intake air to be sucked into an internal combustion engine and the heat medium, an inverter converting a direct-current power into an alternate-current power, and a battery cooler cooling a battery with the heat medium, the first heat exchanger is a first radiator exchanging heat between outside air and the heat medium, the second heat exchanger is a second radiator exchanging heat between outside air and the heat medium, and the second radiator is disposed on an upstream side of an outside air flow with respect to the first radiator, or on a vertically downward side with respect to the first radiator.

16. The thermal management system for a vehicle according to claim 1, wherein the first heat exchanger is a radiator exchanging heat between outside air and the heat medium, and in the temperature-adjustment target-device arrangement flow path, the temperature adjustment target device and the radiator are arranged in parallel with each other.

17. The thermal management system for a vehicle according to claim 14, wherein the first heat exchanger is a radiator exchanging heat between the heat medium and outside air, the second heat exchanger is a chiller exchanging heat between a low-pressure refrigerant in the refrigeration cycle and the heat medium, the radiator is disposed in the first-pump arrangement flow path, and the chiller is disposed in the second-pump arrangement flow path.

18. The thermal management system for a vehicle according to claim 1, wherein the switching portion includes a housing with a heat medium flow path formed therein, a valve body accommodated in the housing, and a rotary shaft fixed to the valve body, the valve body is a plate-like valve body that partitions an internal space of the housing into two spaces, or is a rotary valve body that partitions an internal space of the housing into two spaces, and in the housing, the numerous flow paths are connected side by side in a rotation direction of the valve body.

* * * * *